United States Patent Office 3,631,029
Patented Dec. 28, 1971

3,631,029
PROCESS FOR PRODUCING BENZODIAZEPINE DERIVATIVES
Hisao Yamamoto, Nishinomiya-shi, Shigeho Inaba, Takarazuka-shi, Tadashi Okamoto, Ashiya-shi, Toshiyuki Hirohashi, Kobe, Kikuo Ishizumi and Michihiro Yamamoto, Takarazuka-shi, Isamu Maruyama, Minoo-shi, Kazuo Mori, Kobe, and Tsuyoshi Kobayashi, Minoo-shi, Japan, assignors to Sumitomo Chemical Company, Ltd., Osaka, Japan
No Drawing. Filed Nov. 22, 1968, Ser. No. 778,348
Claims priority, application Japan, Dec. 1, 1967, 42/77,234, 42/77,238; Dec. 5, 1967, 42/78,270, 42/78,271; Dec. 6, 1967, 42/78575; Dec. 9 1967, 42/79,166; Dec. 12, 1967, 42/79,924; Dec. 15, 1967, 42/80,514; Dec. 21, 1967, 42/82,273; Mar. 11, 1968, 43/16,033
Int. Cl. C07d 53/06
U.S. Cl. 260—239.3     17 Claims

ABSTRACT OF THE DISCLOSURE 1-substituted or unsubstituted 5-phenyl-benzodiazepine-2-ones are produced with commercial advantage through ring expansion by oxydation of N-substituted or unsubstituted-2-aminomethyl-3-phenyl-indoles. The starting 2-aminomethyl-indoles are prepared by subjecting indole-2-carboxylic acids either to direct amination with ammonia or to halogenation and then amination with ammonia, reducing the yielding indole-2-carbonamides to 2-cyano-indoles and hydrogenating the cyano indoles, provided that when N-unsubstituted-indoles are used the substitution may be effected optionally in any time before or after the above procedures.

---

The present invention relates to a process for producing benzodiazepine derivatives. More particularly, the invention pertains to a novel process for producing benzodiazepine derivatives represented by the Formula I

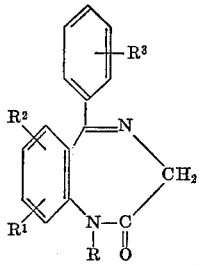

(I)

wherein R is a hydrogen atom or an alkyl group having 1 to 4 carbon atoms; $R^1$ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; $R^2$ is a hydrogen or halogen atom, an alkyl, alkoxy or halogenoalkyl group having 1 to 4 carbon atoms or a nitro group; and $R^3$ is a hydrogen or halogen atom or an alkyl, alkoxy or halogenoalkyl group having 1 to 4 carbon atoms.

That is, the invention relates to a process, according to which benzodiazepine derivatives represented by the Formula I are readily obtained by reacting a 2-aminomethyl-indole derivative represented by the Formula II

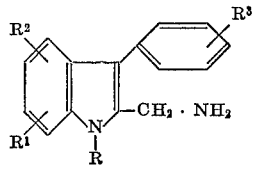

(II)

wherein R, $R^1$, $R^2$ and $R^3$ respectively have the same meanings as defined above, or its salt with an appropriate oxidizing agent.

The benzodiazepine derivatives represented by the Formula I are known as a remarkably effective tranquilizer, muscle relaxant, anti-convulsant and hypnotic.

A few processes for producing the benzodiazepine derivatives have been described. For instance, which is one of the most useful procedures by now, a benzodiazepine derivative is obtained by reacting a 2-aminobenzophenone derivative with glycine hydrochloride or glycine ethyl ester (German Pat. 1,145,626).

A benzodiazepine derivative is also prepared by treating a chloroacetamidobenzophenone with ammonia. [Sternbach et al.: Journal of Organic Chemistry 27, 3788 (1962) and German Pat. 1,136,709].

On the contrary to these procedures, to our astonishment, we have found that a benzodiazepine derivative having the Formula I can be prepared smoothly and economically in high yield and in high purity by reacting a 2-aminomethyl-indole derivative having the Formula II or its salt with an appropriate oxidizing agent. Such a process for converting a 5-membered ring compound into a 7-membered ring compound by ring expansion reaction has not heretofore been described or suggested in the literature. Therefore, the novel process of the present invention is unobvious from the known method of the similar processes, and moreover very much useful and unexpected procedure.

These novel starting materials, 2-aminomethylindole derivatives are prepared easily, for example, by the reduction of indole-2-carboxamide derivatives or indole-2-carbonitrile derivatives. The novel indole-2-carbonitrile derivatives are prepared by dehydrating indole-2-carboxamide.

These indole-2-carboxamide derivatives are also novel compounds, which are prepared by the amidation of indole-2-carboxylic acid derivatives in good yield. Further, most of the indole-2-carboxylic acid derivatives are novel, which are obtained, for example, by the cyclization of benzene diazonium compounds with ester derivatives of α-benzyl-β-keto acid.

All of these processes proceed smoothly and give the objective products in high yield, so these procedures are very much useful in practice.

One object of the present invention is to provide a novel process for preparing benzodiazepine derivatives represented by th e Formula I.

Another object is to provide a novel process for producing salts of benzodiazepine derivatives by treating the benzodiazepine derivatives of the Formula I with a mineral acid or an oragnic acid.

A further object of the present invention is to provide novel indole derivatives and novel phenylhydrazone derivatives.

Other objects of the present invention will be apparent from the following description.

In order to accomplish these objects, the present invention provides a process for preparing benzodiazepine derivatives represented by the Formula I, which comprises reacting a 2-aminomethylindole derivative represented by the Formula II or its salt with an oxidizing agent.

Further the present invention provides a process for producing salts of benzodiazepine derivatives of the Formula I, which comprises reacting a 2-aminomethylindole derivative of the Formula II or its salt with an oxidizing agent to yield the benzodiazepine derivative of the Formula I and then treating the obtained benzodiazepine derivative with a mineral acid or an organic acid.

The process of the present invention is, for example, shown by the following reaction schema, however it is understood that this schema is merely illustrative and does not limit the present invention.

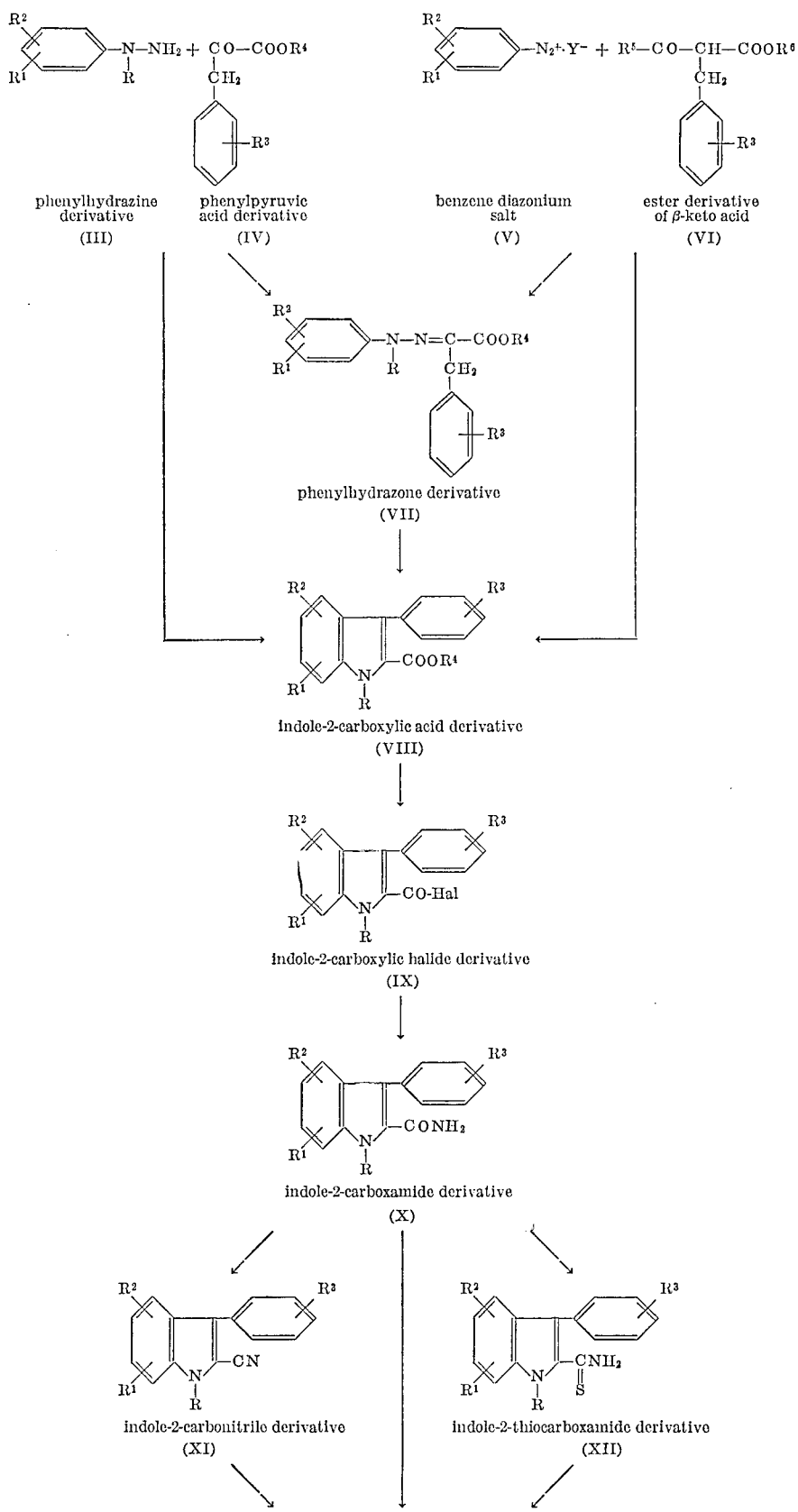

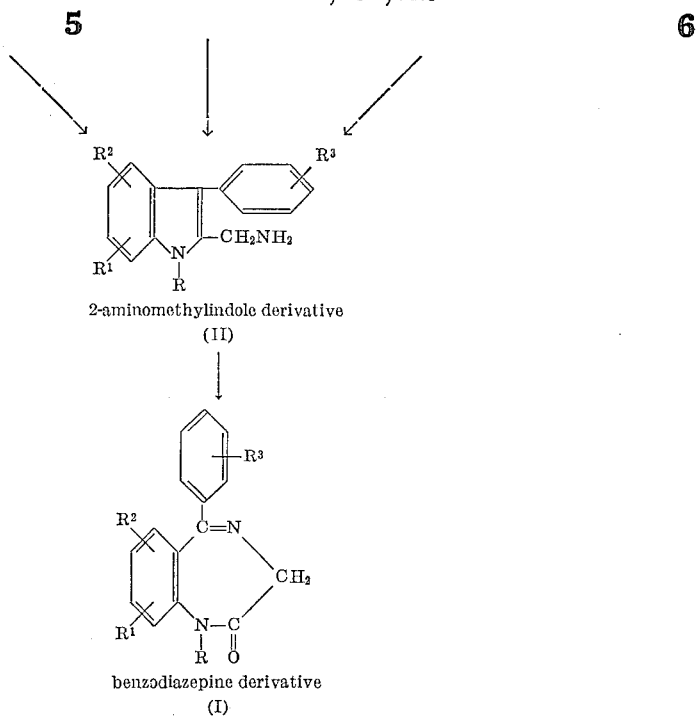

2-aminomethylindole derivative
(II)

benzodiazepine derivative
(I)

wherein R, $R^1$, $R^2$ and $R^3$ respectively have the same meanings as defined above; $R^4$ is a hydrogen atom or an alkyl group having 1 to 4 carbon atoms; $R^5$ is an alkyl group having 1 to 3 carbon atoms; $R^6$ is an alkyl group having 1 to 4 carbon atoms; Y is a halogen atom; and —Hal is a halogen atom.

The process of the present invention is illustrated in detail as follows.

(I) Production of phenylhydrazone derivatives (VII)

In the process of the present invention, phenylhydrazone derivatives (VII) are produced by reacting a phenylhydrazine derivative (III) or its salt with a phenylpyruvic acid derivative (IV).

The reaction is preferably carried out in the presence of an inert solvent such as lower alkanols, e.g. methanol, ethanol and the like or an organic acid such as formic acid, acetic acid and the like. The reaction proceeds at a room temperature although a slightly elevated temperature may be employed to increase the rate of reaction.

In the present invention, examples of phenylhydrazone derivatives (VII) include the following compounds:

phenylpyruvic acid p-methylhydrazone
phenylpyruvic acid p-methoxyphenylhydrazone
phenylpyruvic acid p-trifluoromethyl-phenylhydrazone
phenylpyruvic acid p-methylsulfonyl-phenylhydrazone
phenylpyruvic acid p-dimethylamino-phenylhydrazone
phenylpyruvic acid p-diethylamino-phenylhydrazone
phenylpyruvic acid (p-(1'-piperazinyl)phenylhydrazone
phenylpyruvic acid 3,4-dimethyl-phenylhydrazone
phenylpyruvic acid 4-bromo-3-methoxy-phenylhydrazone
o-chlorophenylpyruvic acid p-methylphenylhydrazone
o-chlorophenylpyruvic acid p-methoxyphenylhydrazone
o-chlorophenylpyruvic acid p-dimethylamino-phenylphydrazone
o-fluorophenylpyruvic acid p-methyl-phenylhydrazone
o-fluorophenylpyruvic acid p-methoxy-phenylhydrazone
o-fluorophenylpyruvic acid p-trifluoromethyl-phenylhydrazone
o-fluorophenylpyruvic acid p-methylsulfonyl-phenylhydrazone
o-fluorophenylpyruvic acid p-dimethylamino-phenylhydrazone
phenylpyruvic acid N'-methyl-p-methylphenylhydrazone
phenylpyruvic acid N'-methyl-p-trifluoromethyl-phenylhydrazone
methyl phenylpyruvate p-methylphenylhydrazone
ethyl phenylpyruvate p-methylphenylhydrazone Further, in the process of the present invention, it is also possible to obtain the phenylhydrazone derivatives represented by the formula,

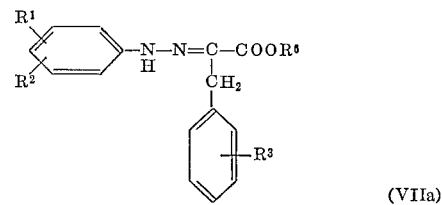

(VIIa)

wherein $R^1$, $R^2$, $R^3$ and $R^6$ have the same meanings as defined above, by reacting a benzene diazonium salt (V) with an ester derivative of β-keto acid (VI).

In carrying out this reaction, an ester derivative of β-keto acid (VI)

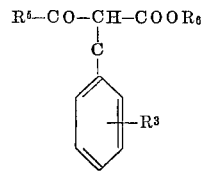

may be allowed to react with a benzene diazonium salt (V)

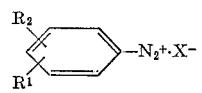

in the presence of a base, for example, such as sodium hydroxide, potassium hydroxide, sodium methylate, sodium ethylate, sodium acetate and potassium acetate in an appropriate solvent, for example, water, methanol or ethanol, whereby the reaction readily proceeds. Because of unstability of the benzene diazonium salt (V), the reaction is preferably carried out below 10° C.

In the present invention, examples of phenylhydrazone derivatives (VIIa) include the following compound:

methyl phenylpyruvate p-methylphenylhydrazone
ethyl phenylpyruvate p-methylphenylhydrazone
tertiary butyl phenylpyruvate p-methylphenylhydrazone
ethyl phenyl pyruvate p-methoxylphenylhydrazone
ethyl phenyl pyruvate p-trifluoromethyl-phenylhydrazone
ethyl phenyl pyruvate p-methylsulfonyl-phenylhydrazone
ethyl phenyl pyruvate p-ethylsulfonyl-phenylhydrazone
ethyl phenyl pyruvate p-dimethylamino-phenylhydrazone
ethyl phenyl pyruvate p-diethylamino-phenylhydrazone
ethyl o-fluorophenylpyruvate p-methyl-phenylhydrazone
ethyl o-fluorophenylpyruvate p-methoxy-phenylhydrazone
ethyl o-fluorophenylpyruvate p-trifluoromethyl-phenylhydrazone
ethyl o-fluorophenylpyruvate p-methylsulfonyl-phenylhydrazone
ethyl o-fluorophenylpyruvate p-dimethylamino-phenylhydrazone
ethyl phenyl pyruvate 4-bromo-3-methoxy-phenylhydrazone
ethyl p-methylphenylpyruvate 4-methyl-phenylhydrazone
ethyl o-chlorophenyl pyruvate p-methylphenylhydrazone
ethyl o-chlorophenyl pyruvate p-methoxyphenylhydrazone
ethyl o-chlorophenyl pyruvate p-dimethylaminophenylhydrazone (II) Production of indole-2-carboxylic acid derivatives (VIII)

In the process of the present invention, indole-2-carboxylic acid derivatives (VIII) are obtained by heating a phenylhydrazone derivative (VII) in a solvent or solvent mixture. As solvents, there may be employed any solvent which is inert to the system, and examples of them include lower alkanols such as methanol, ethanol, isopropanol and tertiary butanol, aromatic solvents such as benzene, toluene and xylene, organic acids such as formic acid and acetic acid or other organic solvent such as acetone, chloroform and cyclohexane. The reaction is preferably carried out in the presence of an acid; mineral acids such as hydrochloric acid, hydrobromic acid, sulfuric acid, phosphoric acid and polyphosphoric acid, organic acid such as formic acid and acetic acid or other acidic reagents including Lewis acid such as zinc chloride, ferric chloride, aluminum chloride and boron fluoride. The reaction is generally effected at elevated temperature.

In the present invention, examples of indole-2-carboxylic acid derivatives (VIII) include the following compounds:

5-methyl-3-phenyl-indole-2-carboxylic acid
5-methoxy-3-phenyl-indole-2-carboxylic acid
6 (or 8)-methoxy-3-phenyl-indole-2-carboxylic acid
5-trifluoromethyl-3-phenyl-indole-2-carboxylic acid
5-methylsulfonyl-3-phenyl-indole-2-carboxylic acid
5-ethylsulfonyl-3-phenyl-indole-2-carboxylic acid
5-dimethylamino-3-phenyl-indole-2-carboxylic acid
5-diethylamino-3-phenyl-indole-2-carboxylic acid
5-piperidino-3-phenyl-indole-2-carboxylic acid
3-(o-chlorophenyl)-5-methyl-indole-2-carboxylic acid
3-(o-chlorophenyl)-5-methoxy-indole-2-carboxylic acid
3-(o-chlorophenyl)-5-dimethylamino-indole-2-carboxylic acid
3-(o-fluorophenyl)-5-methyl-indole-2-carboxylic acid
3-(o-fluorophenyl)-5-methoxy-indole-2-carboxylic acid
3-(o-fluorophenyl)-5-trifluoromethyl-indole-2-carboxylic acid
3-(o-fluorophenyl)-5-methylsulfonyl-indole-2-carboxylic acid
1,5-dimethyl-3-phenyl-indole-2-carboxylic acid
1-methyl-3-phenyl-5-trifluoromethyl-indole-2-carboxylic acid
ethyl 5-methyl-3-phenyl-indole-2-carboxylate
methyl 5-methyl-3-phenyl-indole-2-carboxylate
tertiary butyl 5-methyl-3-phenyl-indole-2-carboxylate
ethyl 5-methyl-3-phenyl-indole-2-carboxylate
ethyl 3-phenyl-5-trifluoromethyl-indole-2-carboxylate
ethyl 5-methylsulfonyl-3-phenyl-indole-2-carboxylate
ethyl 5-ethyl-sulfonyl-3-phenyl-indole-2-carboxylate
ethyl 5-dimethylamino-3-phenyl-indole-2-carboxylate
ethyl 5-diethylamino-3-phenyl-indole-2-carboxylate
ethyl 3-(o-fluorophenyl)-5-methyl-indole-2-carboxylate
ethyl 3-(o-fluorophenyl)-5-methoxy-indole-2-carboxylate
ethyl 3-(o-fluorophenyl)-5-trifluoromethyl-indole-2-carboxylate
ethyl 3-(o-fluorophenyl)-5-methylsulfonyl-indole-2-carboxylate
ethyl 3-(o-chlorophenyl)-5-methoxy-indole-2-carboxylate
ethyl 3-(o-chlorophenyl)-5-dimethylamino-indole-2-carboxylate
ethyl 5-bromo-6-methoxy-3-phenyl-indole-2-carboxylate
ethyl 5-methyl-3-(p-tolyl)-indole-2-carboxylate Further, the indole-2-carboxylic acid derivatives (VIII) are readily obtained by reacting a phenylhydrazine derivative (III) or its salt with a phenylpyruvic acid derivative (IV). This reaction can be carried out in a solvent, for example, an alkanol such as methanol, ethanol, isopropanol, tertiary butanol, aromatic hydrocarbon such as benzene, toluene, xylene and the like, organic acid such as formic acid, acetic acid and the like, or another inert organic solvent such as acetone, chloroform, cyclohexane and the like, preferably in the presence of an acid catalyst, for example, mineral acid such as hydrogen chloride, hydrogen bromide, sulfuric acid, phosphoric acid, polyphosphoric acid and the like, organic acid such as formic acid and acetic acid, Lewis acid such as zinc chloride, ferric chloride, aluminum chloride, boron fluoride and the like, or cation exchange resin. When a salt of the phenylhydrazine derivative (III) is used as a starting material, the reaction proceeds even in the absence of the above-mentioned acid catalyst to give the objective indole-2-carboxylic acid derivatives (VIII). Examples of the salts of the phenylhydrazine derivatives (III) usable in the present process include inorganic acid salt such as hydrochloride, hydrobromide and sulfate or organic acid salt such as acetate and oxalate.

The reaction usually proceeds at room temperature, but if desired, the reaction may be controlled by heating or cooling, though the heating and cooling are not always necessary.

In the present invention, examples of indole-2-carboxylic acid derivatives (VIII) include the following compounds:

5-methyl-3-phenyl-indole-2-carboxylic acid
5-methoxy-3-phenyl-indole-2-carboxylic acid
6 (or 8)-methoxy-3-phenyl-indole-2-carboxylic acid
5-trifluoromethyl-3-phenyl-indole-2-carboxylic acid
5-methylsulfonyl-3-phenyl-indole-2-carboxylic acid
5-ethylsulfonyl-3-phenyl-indole-2-carboxylic acid
5-dimethylamino-3-phenyl-indole-2-carboxylic acid
5-diethylamino-3-phenyl-indole-2-carboxylic acid
5-piperidino-3-phenyl-indole-2-carboxylic acid
3-(o-chlorophenyl)-5-methyl-indole-2-carboxylic acid
3-(o-chlorophenyl)-5-methoxy-indole-2-carboxylic acid
3-(o-chlorophenyl)-5-dimethylamino-indole-2-carboxylic acid
3-(o-fluorophenyl)-5-methyl-indole-2-carboxylic acid
3-(o-fluorophenyl)-5-methoxy-indole-2-carboxylic acid
3-(o-fluorophenyl)-5-trifluoromethyl-indole-2-carboxylic acid
3-(o-fluorophenyl)-5-methylsulfonyl-indole-2-carboxylic acid
1,5-dimethyl-3-phenyl-indole-2-carboxylic acid
1-methyl-3-phenyl-5-trifluoromethyl-indole-2-carboxylic acid.

Furthermore, indole-2-carboxylic acid ester derivatives represented by the formula,

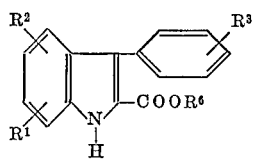

(VIIIa)

wherein $R^1$, $R^2$, $R^3$ and $R^4$ have the same meanings as defined above, are obtained directly by treating a benzene diazonium salt (V) with an ester derivative of β-keto acid (VI).

In carrying out this process, the ester derivative of β-keto acid (VI) may be allowed to react with the benzene diazonium salt (V) in the presence of a base, such as sodium hydroxide, potassium hydroxide, sodium methylate, sodium ethylate, sodium acetate and potassium acetate in an appropriate solvent, such as water, methanol and ethanol, whereby the reaction readily proceeds. Because of unstability of the benzene diazonium salt (V), it is preferable to carry out the reaction below 10° C., more preferably below 5° C. Thereafter, treatment of the reaction product with an acid causes formation of the indole-2-carboxylic acid ester derivative (VIIIa). However, the reaction product is preferably once isolated before the next step. In this reaction, an acid, for example, mineral acid such as hydrogen chloride, hydrogen bromide, sulfuric acid, phosphoric acid, polyphosphoric acid, and the like, or other Lewis acid such as zinc chloride, ferric chloride, aluminum chloride, stannous chloride, boron fluoride and the like is suitable. In this reaction, following solvents are most useful, for example, alkanols such as methanol, ethanol and isopropanol, aromatic hydrocarbons such as benzene, toluene and xylene, organic acids such as formic acid and acetic acid, or other organic solvents such as acetone, chloroform and cyclohexane.

In the present invention, examples of indole-2-carboxylic acid derivatives (VIIIa) include the following compounds:

ethyl 5-methyl-3-phenyl-indole-2-carboxylate
methyl 5-methyl-3-phenyl-indole-2-carboxylate
tertiary butyl 5-methyl-3-phenyl-indole-2-carboxylate
ethyl 5-methyl-3-phenyl-indole-2-carboxylate
ethyl 3-phenyl-5-trifluoromethyl-indole-2-carboxylate
ethyl 5-methylsulfonyl-3-phenyl-indole-2-carboxylate
ethyl 5-ethyl-sulfonyl-3-phenyl-indole-2-carboxylate
ethyl 5-dimethylamino-3-phenyl-indole-2-carboxylate
ethyl 5-diethylamino-3-phenyl-indole-2-carboxylate
ethyl 3-(o-fluorophenyl)-5-methyl-indole-2-carboxylate
ethyl 3-(o-fluorophenyl)-5-methoxy-indole-2-carboxylate
ethyl 3-(o-fluorophenyl)-5-trifluoromethyl-indole-2-carboxylate
ethyl 3-(o-fluorophenyl)-5-methylsulfonyl-indole-2-carboxylate
ethyl 3-(o-chlorophenyl)-5-methoxy-indole-2-carboxylate
ethyl 3-(o-chlorophenyl)-5-dimethylamino-indole-2-carboxylate
ethyl 5-bromo-6-methoxy-3-phenyl-indole-2-carboxylate
ethyl 5-methyl-3-(p-tolyl)-indole-2-carboxylate Furthermore, in the process of the present invention, indole-2-carboxylic acid derivatives represented by the formula,

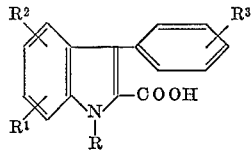

(VIIIb)

wherein R, $R^1$, $R^2$ and $R^3$ have the same meanings as defined above, can be produced by converting an indole-2-carboxylic acid ester derivative represented by the Formula (VIIIc)

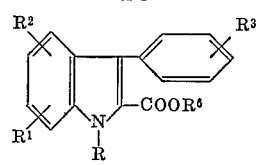

(VIIIc)

wherein R, $R^1$, $R^2$, $R^3$ and $R^6$ have the same meanings as defined above, to its corresponding free acid. That is, when the indole-2-carboxylic acid ester derivative (VIIIc) is treated in water and/or alcanols such as methanol or ethanol, preferably in the presence of a hydrolyzing agent, the indole-2-carboxylic acid derivative (VIIIb) is obtained.

Examples of the hydrolyzing agents usable in this reaction include mineral acid such as hydrochloric acid and sulfuric acid, alkali metal hydroxide such as sodium hydroxide and potassium hydroxide, alkali metal carbonate such as sodium carbonate and potassium carbonate, alkaline earth metal hydroxide such as barium hydroxide, and calcium hydroxide, and ammonium compound such as ammonium hydroxide or the like, among which alkali metal hydroxide or alkaline earth metal hydroxide is preferable. The reaction can be carried out even at room temperature, preferably at an elevated temperature.

Furthermore, the indole-2-carboxylic acid ester derivative (VIIIc) can be converted to the indole-2-carboxylic acid derivative (VIIIb) by treating in an organic acid such as acetic acid and propionic acid in the presence of a mineral acid.

Alternatively, when $R^6$ of the indole-2-carboxylic acid ester derivative (VIIIc) is a tertiary butyl group, the indole-2-carboxylic acid ester derivative (VIIIc) can also be converted to the objective indole-2-carboxylic acid derivative (VIIIb) by heating the same with a mineral acid or toluene-sulfonic acid. When $R^6$ of the indole-2-carboxylic acid ester derivative (VIIIc) is a benzyl group, the benzyl group can also be removed by hydrogenolysis. The objective substance can be obtained as a metal salt or ammonium salt.

In the present invention, examples of indole-2-carboxylic acid derivatives (VIIIc) include the following compounds:

5-methyl-3-phenyl-indole-2-carboxylic acid
5-methoxy-3-phenyl-indole-2-carboxylic acid
6 (or 8)-methoxy-3-phenyl-indole-2-carboxylic acid
5-trifluoromethyl-3-phenyl-indole-2-carboxylic acid
5-methylsulfonyl-3-phenyl-indole-2-carboxylic acid
5-ethylsulfonyl-3-phenyl-indole-2-carboxylic acid
5-dimethylamino-3-phenyl-indole-2-carboxylic acid
5-diethylamino-3-phenyl-indole-2-carboxylic acid
5-piperidino-3-phenyl-indole-2-carboxylic acid
3-(o-chlorophenyl)-5-methy-indole-2-carboxylic acid
3-(o-chlorophenyl)-5-methoxy-indole-2-carboxylic acid
3-(o-chlorophenyl)-5-dimethylamino-indole-2-carboxylic acid
3-(o-fluorophenyl)-5-methyl-indole-2-carboxylic acid
3-(o-fluorophenyl)-5-methoxy-indole-2-carboxylic acid
3-(o-fluorophenyl)-5-trifluoromethyl-indole-2-carboxylic acid
3-(o-fluorophenyl)-5-methylsulfonyl-indole-2-carboxylic acid
1,5-dimethyl-3-phenyl-indole-2-carboxylic acid
1-methyl-3-phenyl-5-trifluoromethyl-indole-2-carboxylic acid
5-methoxy-1-methyl-3-phenyl-indole-2-carboxylic acid
1-ethyl-5-methylsulfonyl-3-phenyl-indole-2-carboxylic acid
1-methyl-5-methylsulfonyl-3-phenyl-indole-2-carboxylic acid
5-ethylsulfonyl-1-methyl-3-phenyl-indole-2-carboxylic acid
1-methyl-3-phenyl-5-trifluoromethyl-indole-2-carboxylic acid 3-(o-fluorophenyl)-1-methyl-5-trifluoromethyl-indole-2-carboxylic acid
3-(o-fluorophenyl)-1-methyl-5-methylsulfonyl-indole-2-carboxylic acid
3-(o-chlorophenyl)-5-dimethylamino-1-methyl-indole-2-carboxylic acid
5-dimethylamino-1-methyl-3-(o-trifluoromethyl)-indole-2-carboxylic acid
5,6-dimethyl-3-phenyl-indole-2-carboxylic acid
5,6-dimethoxy-3-phenyl-indole-2-carboxylic acid
5-chloro-7-methyl-3-phenyl-indole-2-carboxylic acid
5-methyl-7-nitro-3-phenyl-indole-2-carboxylic acid
5-methyl-3-(p-tolyl)-indole-2-carboxylic acid
5-methyl-3-(p-methoxyphenyl) - indole-2-carboxylic acid
5-methyl-3-(p-nitrophenyl)-indole-2-carboxylic acid.

Still further, in the process of the present invention, 1-alkyl-indole-2-carboxylic acid derivatives represented by the formula,

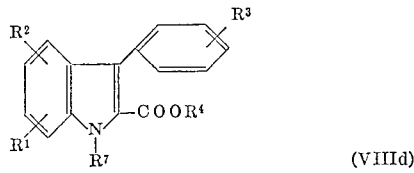

(VIIId)

wherein $R^1$, $R^2$, $R^3$ and $R^4$ have the same meanings as defined above and $R^7$ is a lower alkyl group having 1–4 carbon atoms, are obtained by reacting an indole-2-carboxylic acid derivative represented by the formula,

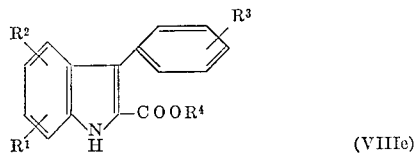

(VIIIe)

wherein $R^1$, $R^2$, $R^3$ and $R^4$ have the same meanings as defined above, with an alkylating agent. The alkylation is carried out by treating the indole-2-carboxylic acid derivative (VIIIe) with an alkylating agent in the presence of an alkaline condensing agent, or after the alkali metal salt has been formed by the alkaline metal and then treating the obtained alkali metal salt with alkylating agent. Alkaline agents, used in the process of the present invention include alkali metal, alkaline earth metal, alkali metal hydride, alkaline earth metal hydride, alkali metal hydroxide, alkaline earth metal hydroxide, alkali metal amide and alkaline earth metal amide.

Alkylation of an indole-2-carboxylic acid derivative (VIIIe) is carried out by contacting it with following compounds, for example, alkyl halide such as methyl iodide, ethyl bromide, ethyl iodide and butyl bromide, alkyl sulfate such as dimethyl sulfate and diethyl sulfate, and such alkyl aromatic sulfonate as methyl paratoluenesulfonate and the like.

In the present invention, examples of indole-2-carboxylic acid derivatives (VIIId) include the following compounds:

1,5-dimethyl-3-phenyl-indole-2-carboxylic acid
5-methoxy-1-methyl-3-phenyl-indole-2-carboxylic acid
6 (or 8)-methoxy-1-methyl-3-phenyl-indole-2-carboxylic acid
1-methyl-5-trifluoromethyl-3-phenyl-indole-2-carboxylic acid
1-methyl-5-methylsulfonyl-3-phenyl-indole-2-carboxylic acid
1-ethyl-5-methylsulfonyl-3-phenyl-indole-2-carboxylic acid
1-methyl-5-ethylsulfonyl-3-phenyl-indole-2-carboxylic acid
5-dimethylamino-1-methyl-3-phenyl-indole-2-carboxylic acid
5-diethylamino-1-methyl-3-phenyl-indole-2-carboxylic acid
1-methyl-5-piperidino-3-phenyl-indole-2-carboxylic acid
3-(o-chlorophenyl)-1,5-dimethyl-indole-2-carboxylic acid
3-(o-chlorophenyl)-5-methoxy-1-methyl-indole-2-carboxylic acid
3-(o-chlorophenyl)-5-dimethylamino-1-methyl-indole-2-carboxylic acid
3-(o-fluorophenyl)-1,5-dimethyl-indole-2-carboxylic acid
3-(o-fluorophenyl)-5-methoxy-1-methyl-indole-2-carboxylic acid
3-(o-fluorophenyl)-1-methyl-5-trifluoromethyl-indole-2-carboxylic acid
3-(o-fluorophenyl)-1-methyl-5-methtylsulfonyl-indole-2-carboxylic acid
1-ethyl-5-methyl-3-phenyl-indole-2-carboxylic acid
ethyl 1,5-dimethyl-3-phenyl-indole-2-carboxylic acid
methyl 1,5-dimethyl-3-phenyl-indole-2-carboxylate
ethyl 3-phenyl-5-1-methyl-trifluoromethyl-indole-2-carboxylate
ethyl 1-methyl-5-methylsulfonyl-3-phenyl-indole-2-carboxylate
ethyl 5-ethylsulfonyl-1-methyl-3-phenyl-indole-2-carboxylate
ethyl 5-dimethylamino-1-methyl-3-phenyl-indole-2-carboxylate
ethyl 5-diethylamino-1-methyl-3-phenyl-indole-2-carboxylate
ethyl 3-(o-fluorophenyl)-1,5-dimethyl-indole-2-carboxylate
ethyl 3-(o-fluorophenyl)-5-methoxy-1-methyl-indole-2-carboxylate
ethyl 3-(o-fluorophenyl)-1-methyl-5-trifluoromethyl-indole-2-carboxylate
ethyl 3-(o-fluorophenyl)-1-methyl-5-methylsulfonyl-indole-2-carboxylate
ethyl 3-(o-chlorophenyl)-1-methyl-5-methoxy-indole-2-carboxylate
ethyl 3-(o-chlorophenyl)-5-dimethylamino-1-methyl-indole-2-carboxylate
ethyl 5-bromo-6-methoxy-1-methyl-3-phenyl-indole-2-carboxylate
ethyl 1,5-dimethyl-3-(p-tolyl)-indole-2-carboxylate (III) Production of indole-2-carboxamide derivatives (X)

In the process of the present invention, indole-2-carboxamide derivatives (X) are obtained by reacting an indole-2-carboxylic acid derivative (VIIIb) or its reactive derivative with ammonia. Examples of the reactive derivatives of the carboxylic acid derivatives used in the process of the present invention include indole-2-carboxylic halide derivatives (IX), which are produced by halogenation of the indole-2-carboxylic acid derivatives (VIIIb), or esters of the indole-2-carboxylic acid derivatives (VIIIb), for example, such as a tertiary butyl ester, a benzyl ester or a p-nitrophenyl ester, or acid anhydrides or mixed acid anhydrides of the indole-2-carboxylic acid derivatives (VIIIb) such as a mixed anhydride which includes mixed anhydrides described in "Organic Reactions," vol. 12, p. 157 (1962).

Indole-2-carboxylic halide derivatives (IX), which are used as starting materials in the above amidation, are produced by reacting an indole-2-carboxylic acid derivative (VIIIb) with a halogenating agent.

In carrying out this halogenation process, the indole-2-carboxylic acid derivative (VIIIb) is treated with a halogenating agent in the absence of a solvent or in an inert solvent, such as benzene, toluene, ether, chloroform, methyl chloride and carbon tetrachloride. As the halogenating agent, following compounds are useful; for example, thionyl chloride, phosphorus trichloride, phosphorus tribromide, phosphorus pentachloride, phosphorus oxychloride and phosgene. In this case, the some reaction can also be promoted by adding a basic substance such as dimethylformamide. Further, in this process, a free carboxylic acid and the metal salt may be used as a starting material.

The reaction product is obtained by removing the solvent and excess of the halogenating agents, if necessary, by treatment such as extraction with an inert solvent to give the objective product. The isolation or purification of indole-2-carboxylic halide derivative is not always necessary for converting to indole-2-carboxamide.

In carrying out the amidation of the present process, the indole-2-carboxylic acid derivative VIIIb or its reactive derivative such as acid halide, ester or acid anhydride is allowed to react with ammonia in a suitable solvent.

In the reaction, following solvents can be used, for example, alcohols such as methanol, ethanol and organic solvents such as ether, benzene, toluene, xylene, chlorobenzene and chloroform, and liquid ammonia.

In the amidation reaction, ammonia can be used by introducing gaseous ammonia to a reaction mixture or adding alcoholic ammonia (such as methanolic ammonia, ethanolic ammonia) or aqueous ammonia to a reaction mixture.

Because the reaction usually proceeds at room temperature, heating or cooling is not always necessary. However, the reaction may be controlled by heating or cooling, if desired.

In the present invention, examples of indole-2-carboxylic halide derivatives IX include the following compounds:

5-methyl-3-phenyl-indole-2-carboxylic chloride
5-methyl-3-phenyl-indole-2-carboxylic bromide
5-methoxy-3-phenyl-indole-2-carboxylic chloride
6 (or 8)-methoxy-3-phenyl-indole-2-carboxylic chloride
5-trifluoromethyl-3-phenyl-indole-2-carboxylic chloride
5-methylsulfonyl-3-phenyl-indole-2-carboxylic chloride
5-ethylsulfonyl-3-phenyl-indole-2-carboxylic chloride
5-dimethylamino-3-phenyl-indole-2-carboxylic chloride
5-diethylamino-3-phenyl-indole-2-carboxylic chloride
5-piperidino-3-phenyl-indole-2-carboxylic chloride
3-(o-chlorophenyl)-5-methyl-indole-2-carboxylic chloride
3-(o-chlorophenyl)-5-methoxy-indole-2-carboxylic chloride
3-(o-chlorophenyl)-5-dimethylamino-indole-2-carboxylic chloride
3-(o-fluorophenyl)-5-methyl-indole-2-carboxylic chloride
3-(o-fluorophenyl)-5-methoxy-indole-2-carboxylic chloride
3-(o-fluorophenyl)-5-trifluoromethyl-indole-2-carboxylic chloride
3-(o-fluorophenyl)-5-methylsulfonyl-indole-2-carboxylic chloride
1,5-dimethyl-3-phenyl-indole-2-carboxylic chloride
1-methyl-3-phenyl-5-trifluoromethyl-indole-2-carboxylic chloride
5-methoxy-1-methyl-3-phenyl-indole-2-carboxylic chloride
1-ethyl-5-methylsulfonyl-3-phenyl-indole-2-carboxylic chloride
1-methyl-5-methylsulfonyl-3-phenyl-indole-2-carboxylic chloride
5-ethylsulfonyl-1-methyl-3-phenyl-indole-2-carboxylic chloride
1-methyl-3-phenyl-5-trifluoromethyl-indole-2-carboxylic chloride
3-(o-fluorophenyl)-1-methyl-5-trifluoromethyl-indole-2-carboxylic chloride
3-(o-fluorophenyl)-1-methyl-5-methylsulfonyl-indole-2-carboxylic chloride
3-(o-chlorophenyl)-5-dimethylamino-1-methyl-indole-2-carboxylic chloride
5-dimethylamino-1-methyl-3-(o-trifluoromethyl)-indole-2-carboxylic chloride
5,6-dimethyl-3-phenyl-indole-2-carboxylic chloride
5,6-dimethoxy-3-phenyl-indole-2-carboxylic chloride
5-chloro-7-methyl-3-phenyl-indole-2-carboxylic chloride
5-methyl-7-nitro-3-phenyl-indole-2-carboxylic chloride
5-methyl-3-(p-tolyl)-indole-2-carboxylic chloride
5-methyl-3-(p-methoxyphenyl)-indole-2-carboxylic chloride
5-methyl-3-(p-nitrophenyl)-indole-2-carboxylic chloride In the present invention, examples of indole-2-carboxylicamide derivatives X include the following compounds:

5-methyl-3-phenyl-indole-2-carboxamide
5-methoxy-3-phenyl-indole-2-carboxamide
6 (or 8)-methoxy-3-phenyl-indole-2-carboxamide
5-trifluoromethyl-3-phenyl-indole-2-carboxamide
5-methylsulfonyl-3-phenyl-indole-2-carboxamide
5-ethylsulfonyl-3-phenyl-indole-2-carboxamide
5-dimethylamino-3-phenyl-indole-2-carboxamide
5-diethylamino-3-phenyl-indole-2-carboxamide
5-piperidino-3-phenyl-indole-2-carboxamide
3-(o-chlorophenyl)-5-methyl-indole-2-carboxamide
3-(o-chlorophenyl)-5-methoxy-indole-2-carboxamide
3-(o-chlorophenyl)-5-dimethylamino-indole-2-carboxamide
3-(o-fluorophenyl)-5-methyl-indole-2-carboxamide
3-(o-fluorophenyl)-5-methoxy-indole-2-carboxamide
3-(o-fluorophenyl)-5-trifluoromethyl-indole-2-carboxamide
3-(o-fluorophenyl)-5-methylsulfonyl-indole-2-carboxamide
1,5-dimethyl-3-phenyl-indole-2-carboxamide
1-methyl-3-phenyl-5-trifluoromethyl-indole-2-carboxamide
5-methoxy-1-methyl-3-phenyl-indole-2-carboxamide
1-ethyl-5-methylsulfonyl-3-phenyl-indole-2-carboxamide
1-methyl-5-methylsulfonyl-3-phenyl-indole-2-carboxamide
5-ethylsulfonyl-1-methyl-3-phenyl-indole-2-carboxamide
1-methyl-3-phenyl-5-trifluoromethyl-indole-2-carboxamide
3-(o-fluorophenyl)-1-methyl-5-trifluoromethyl-indole-2-carboxamide
3-(o-fluorophenyl)-1-methyl-5-methylsulfonyl-indole-2-carboxamide
3-(o-chlorophenyl)-5-dimethylamino-1-methyl-indole-2-carboxamide
5-dimethylamino-1-methyl-3-(o-trifluoromethyl)-indole-2-carboxamide
5,6-dimethyl-3-phenyl-indole-2-carboxamide
5,6-dimethoxy-3-phenyl-indole-2-carboxamide
5-chloro-7-methyl-3-phenyl-indole-2-carboxamide
5-methyl-7-nitro-3-phenyl-indole-2-carboxamide
5-methyl-3-(p-tolyl)-indole-2-carboxamide
5-methyl-3-(p-methoxyphenyl)-indole-2-carboxamide
5-methyl-3-(p-nitrophenyl)-indole-2-carboxamide.

Further, 1-alkyl-indole-2-carboxamide derivatives represented by the formula,

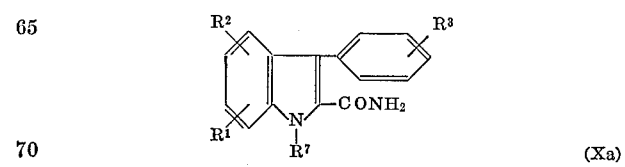

(Xa)

wherein $R^1$, $R^2$, $R^3$ and $R^7$ have the same meanings as defined above, can be obtained by alkylating an indole-2-carboxamide derivative represented by the formula,

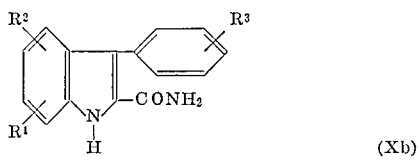

(Xb)

wherein $R^1$, $R^2$ and $R^3$ have the same meanings as identified above.

In practicing this process, the indole-2-carboxamide derivative (Xb) is converted to an alkaline metal salt by treating the same in the presence of a suitable condensing agent, and then the resultant metal salt may be allowed to react with an alkylating agent. As a suitable condensing agent, following compounds are useful: for example, alkali metal, alkaline earth metal, alkali metal hydride, alkaline earth metal hydride, alkali metal hydroxide, alkali earth metal hydroxide, alkali metal amide and alkaline earth metal amide.

1,5-dimethyl-3-phenyl-indole-2-carboxamide
1-methyl-3-phenyl-5-trifluoromethyl-indole-2-carboxamide
5-methoxy-1-methyl-3-phenyl-indole-2-carboxamide
1-ethyl-5-methylsulfonyl-3-phenyl-indole-2-carboxamide
1-methyl-5-methylsulfonyl-3-phenyl-indole-2-carboxamide
5-ethylsulfonyl-1-methyl-3-phenyl-indole-2-carboxamide
1-methyl-3-phenyl-5-trifluoromethyl-indole-2-carboxamide
3-(o-fluorophenyl)-1-methyl-5-trifluoromethyl-indole-2-carboxamide
3-(o-fluorophenyl)-1-methyl-5-methylsulfonyl-indole-2-carboxamide
3-(o-chlorophenyl)-5-dimethylamino-1-methyl-indole-2-carboxamide
5-dimethylamino-1-methyl-3-(o-trifluoromethyl)-indole-2-carboxamide (IV) Production of 2-aminomethylindole derivatives (II)

In the process of the present invention, 2-aminomethylindole derivatives (II) are produced by dehydrating an indole-2-carboxamide derivative (X) to an indole-2-carbonitrile derivative (XI), hydrogenation of which gives the 2-aminomethylindole derivative (II).

In the present invention, examples of 1-alkyl-indole-2-carboxamide derivatives (Xa) include the following compounds:

1,5-dimethyl-3-phenyl-indole-2-carboxamide
1-methyl-3-phenyl-5-trifluoromethyl-indole-2-carboxamide
5-methoxy-1-methyl-3-phenyl-indole-2-carboxamide
1-ethyl-5-methylsulfonyl-3-phenyl-indole-2-carboxamide
1-methyl-5-methylsulfonyl-3-phenyl-indole-2-carboxamide
5-ethylsulfonyl-1-methyl-3-phenyl-indole-2-carboxamide
1-methyl-3-phenyl-5-trifluoromethyl-indole-2-carboxamide
3-(o-fluorophenyl)-1-methyl-5-trifluoromethyl-indole-2-carboxamide
3-(o-fluorophenyl)-1-methyl-5-methylsulfonyl-indole-2-carboxamide
3-(o-chlorophenyl)-5-dimethylamino-1-methyl-indole-2-carboxamide
5-dimethylamino-1-methyl-3-(o-trifluoromethyl)-indole-2-carboxamide In practising this process, an indole-2-carboxamide derivative (X) is heated, preferably in the presence of a dehydrating agent to give an indole-2-carbonitrile derivative (XI). As the dehydrating agent, following compounds are useful: for example, phosphorus halide such as phosphorus oxychloride, phosphorus trichloride and phosphorus pentachloride or acid chloride such as p-toluenesulfonyl chloride, methylsulfonyl chloride, acetyl chloride, thionyl chloride, benzoyl chloride and carbobenzoxy chloride in the presence or absence of an inert solvent.

In the present invention, examples of indole-2-carbonitrile derivatives (XI) include the following compounds:

5-methyl-3-phenyl-indole-2-carbonitrile
5-methoxy-3-phenyl-indole-2-carbonitrile
6 (or 8)-methoxy-3-phenyl-indole-2-carbonitrile
5-trifluoromethyl-3-phenyl-indole-2-carbonitrile
5-methylsulfonyl-3-phenyl-indole-2-carbonitrile
5-ethylsulfonyl-3-phenyl-indole-2-carbonitrile
5-dimethylamino-3-phenyl-indole-2-carbonitrile
5-diethylamino-3-phenyl-indole-2-carbonitrile
5-piperidino-3-phenyl-indole-2-carbonitrile
3-(o-chlorophenyl)-5-methyl-indole-2-carbonitrile
3-(o-chlorophenyl)-5-methoxy-indole-2-carbonitrile
3-(o-chlorophenyl)-5-dimethylamino-indole-2-carbonitrile
3-(o-fluorophenyl)-5-methyl-indole-2-carbonitrile
3-(o-fluorophenyl)-5-methoxy-indole-2-carbonitrile
3-(o-fluorophenyl)-5-trifluoromethyl-indole-2-carbonitrile
3-(o-fluorophenyl)-5-methylsulfonyl-indole-2-carbonitrile
1,5-dimethyl-3-phenyl-indole-2-carbonitrile
1-methyl-3-phenyl-5-trifluoromethyl-indole-2-carbonitrile
5-methoxy-1-methyl-3-phenyl-indole-2-carbonitrile
1-ethyl-5-methylsulfonyl-3-phenyl-indole-2-carbonitrile
1-methyl-5-methylsulfonyl-3-phenyl-indole-2-carbonitrile
5-ethylsulfonyl-1-methyl-3-phenyl-indole-2-carbonitrile
1-methyl-3-phenyl-5-trifluoromethyl-indole-2-carbonitrile
3-(o-fluorophenyl)-1-methyl-5-trifluoromethyl-indole-2-carbonitrile
3-(o-fluorophenyl)-1-methyl-5-methylsulfonyl-indole-2-carbonitrile
3-(o-chlorophenyl)-5-dimethylamino-1-methyl-indole-2-carbonitrile
5-dimethylamino-1-methyl-3-(o-trifluoromethyl)-indole-2-carbonitrile
5,6-dimethyl-3-phenyl-indole-2-carbonitrile
5,6-dimethoxy-3-phenyl-indole-2-carbonitrile
5-chloro-7-methyl-3-phenyl-indole-2-carbonitrile
5-methyl-7-nitro-3-phenyl-indole-2-carbonitrile
5-methyl-3-(p-tolyl)-indole-2-carbonitrile
5-methyl-3-(p-methoxyphenyl)-indole-2-carbonitrile
5-methyl-3-(p-nitrophenyl)-indole-2-carbonitrile Further, in the process of the present invention, 1-alkyl indole-2-carbonitrile derivatives represented by the formula,

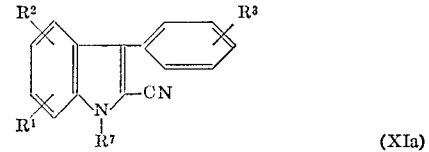

(XIa)

wherein $R^1$, $R^2$, $R^3$ and $R^7$ respectively have the same meanings as defined above, are obtained by N-alkylating an indole-2-carbonitrile derivative represented by the formula,

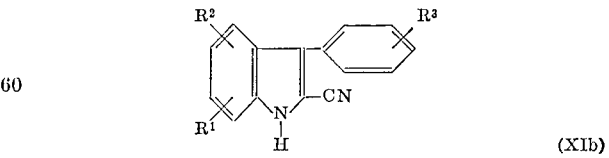

(XIb)

wherein $R^1$, $R^2$ and $R^3$ respectively have the same meanings as defined above.

In practising this N-alkylation, the indole-2-carbonitrile derivative (XIb) is treated with an alkylating agent, if necessary, in the presence of a suitable condensing agent, or after formation of alkali metal salts by treating with an alkaline condensing agent. As the alkylating agent, following compounds are useful: for example, alkyl halide such as methyl iodide, ethyl bromide and butyl bromide, alkyl-sulfuric ester such as dimethyl sulfate, diethyl sulfate or aromatic sulfonic alkylester such as methyl para-toluene-sulfonate. As the alkaline condensing agent, following compounds are useful: for example, alkali metal, alkaline earth metal, alkali metal hydride, alkaline earth metal hydride, alkali metal hydroxide, alkaline earth metal hydroxide, alkali metal amide and alkaline earth metal amide.

In the present invention, examples of indole-2-carbonitrile derivatives (XIa) include the following compounds:

1,5-dimethyl-3-phenyl-indole-2-carbonitrile
1-methyl-3-phenyl-5-trifluoromethyl-indole-2-carbonitrile
5-methoxy-1-methyl-3-phenyl-indole-2-carbonitrile
1-ethyl-5-methylsulfonyl-3-phenyl-indole-2-carbonitrile
1-methyl-5-methylsulfonyl-3-phenyl-indole-2-carbonitrile
5-ethylsulfonyl-1-methyl-3-phenyl-indole-2-carbonitrile
1-methyl-3-phenyl-5-trifluoromethyl-indole-2-carbonitrile
3-(o-fluorophenyl)-1-methyl-5-trifluoromethyl-indole-2-carbonitrile
3-(o-fluorophenyl)-1-methyl-5-methylsulfonyl-indole-2-carbonitrile
3-(o-chlorophenyl)-5-dimethylamino-1-methyl-indole-2-carbonitrile
5-dimethylamino-1-methyl-3-(o-trifluoromethyl)-indole-2-carbonitrile Subsequently, by hydrogenating an indole-2-carbonitrile derivative (XI), 2-aminomethyl indole derivative (II) can readily be obtained. The hydrogenation of the indole-2-carbonitrile derivative (XI) may be carried out by a usual method, for example, electrolytic reduction, reduction by alkali metal in alcohol, catalytic reduction by palladium, nickel or platinum, reduction by chromium acetate-alkali, or reduction by metal hydride complexes which include lithium aluminium hydride, boron hydride and their mixture with an acid such as aluminium chloride, ferric chloride, boron trifluoride, hydrogen chloride or the like. Particularly, the reduction using lithium aluminium hydride or mixture of, for example, lithium aluminium hydride and aluminium chloride, sodium borohydride and aluminium chloride, sodium borohydride and boron trifluoride or the like are preferable from points of simplicity and selectivity.

In the present invention, examples of 2-aminomethyl-indole derivatives (II) include the following compound:

2-aminomethyl-5-methyl-3-phenyl-indole
2-aminomethyl-5-methoxy-3-phenyl-indole
2-aminomethyl-6 (or 4) methoxy-3-phenyl-indole
2-aminomethyl-5-bromo-6 (or 4)-methoxy-3-phenyl-indole
2-aminomethyl-3-phenyl-5-trifluoromethyl-indole
2-aminomethyl-3-phenyl-6 (or 4)-trifluoromethyl-indole
2-aminomethyl-5-methylsulfonyl-3-phenyl-indole
2-aminomethyl-5-ethylsulfonyl-3-phenyl-indole
2-aminomethyl-5-dimethylamino-3-phenyl-indole
2-aminomethyl-5-diethylamino-3-phenyl-indole
2-aminomethyl-3-phenyl-5-piperidino-indole
2-aminomethyl-3-(o-chlorophenyl)-5-methyl-indole
2-aminomethyl-3-(o-chlorophenyl)-5-methoxy-indole
2-aminomethyl-3-(o-chlorophenyl)-5-dimethylamino-indole
2-aminomethyl-3-(o-fluorophenyl)-5-methyl-indole
2-aminomethyl-3-(o-fluorophenyl)-5-methoxy-indole
2-aminomethyl-3-(o-fluorophenyl)-5-trifluoromethyl-indole
2-aminomethyl-3-(o-fluorophenyl)5-methylsulfonyl-indole
2-aminomethyl-3-(o-fluorophenyl)-5-dimethylamino-indole
2-aminomethyl-1,5-dimethyl-3-phenyl-indole
2-aminomethyl-5-methoxy-1-methyl-3-phenyl-indole
2-aminomethyl-1-ethyl-5-methylsulfonyl-3-phenyl-indole
2-aminomethyl-1-methyl-5-methylsulfonyl-3-phenyl-indole
2-aminomethyl-5-ethylsulfonyl-1-methyl-3-phenyl-indole
2-aminomethyl-1-methyl-3-phenyl-5-trifluoromethyl-indole
2-aminomethyl-3-(o-fluorophenyl)-1-methyl-5-trifluoromethyl-indole
2-aminomethyl-3-(o-fluorophenyl) 1-methyl-5-methylsulfonyl-indole
2-aminomethyl-3-(o-chlorophenyl)-5-dimethylamino-1-methyl-indole
2-aminomethyl-5-dimethylamino-1-methyl-3-(o-trifluoromethyl)-indole
2-aminomethyl-5,6-dimethyl-3-phenyl-indole
2-aminomethyl-5,6-dimethoxy-3-phenyl-indole
2-aminomethyl-5-chloro-7-methyl-3-phenyl-indole
2-aminomethyl-5-methyl-7-nitro-3-phenyl-indole
2-aminomethyl-5-methyl-3-(p-tolyl)-indole
2-aminomethyl-5-methyl-3-(p-methoxyphenyl)-indole
2-aminomethyl-5-methyl-3-(p-nitrophenyl)-indole and the hydrochloride, hydrobromide, sulfate and acetate thereof.

Further, in the process of the present invention, it is also possible to convert an indole-2-carboxylic (thio)-amide derivative represented by the formula,

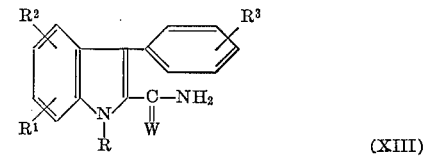

(XIII)

wherein R, $R^1$, $R^2$ and $R^3$ respectively have the same meanings as defined above and W represents an oxygen or sulfur atom, to the 2-aminomethylindole derivative (II).

In the Formula (XIII), when W is a sulfur atom (i.e. indole-2-carboxylic thioamide derivative), the compound (XIII) is produced, for example, by reacting indole-2-carboxamide derivative (XIII) with phosphorus pentasulfide.

The conversion of the indole-2-carboxylic (thio)amide derivative (XIII) to the 2-aminomethylindole derivative (II), is carried out according to electrolytic reduction, reduction by alkali metal in alcohols, catalytic reduction in the presence of a catalyst such as platinum, palladium, nickel catalyst and the like, or reduction with use of metal hydride complex compound. Particularly preferably reduction agents are a metal hydride complex, for example, lithium-aluminum hydride.

In the present invention, examples of 2-aminomethyl-indole derivatives (II) include the following compound:

2-aminomethyl-5-methyl-3-phenyl-indole
2-aminomethyl-5-methoxy-3-phenyl-indole
2-aminomethyl-6 (or 4)-methoxy-3-phenyl-indole
2-aminomethyl-5-bromo-6 (or 4)-methoxy-3-phenyl-indole
2-aminomethyl-3-phenyl-5-trifluoromethyl-indole
2-aminomethyl-3-phenyl-6 (or 4)-trifluoromethyl-indole
2-aminomethyl-5-methylsulfonyl-3-phenyl-indole
2-aminomethyl-5-ethylsulfonyl-3-phenyl-indole
2-aminomethyl-5-dimethylamino-3-phenyl-indole
2-aminomethyl-5-diethylamino-3-phenyl-indole
2-aminomethyl-3-phenyl-5-piperidino-indole
2-aminomethyl-3-(o-chlorophenyl)-5-methyl-indole
2-aminomethyl-3-(o-chlorophenyl)-5-methoxy-indole
2-aminomethyl-3-(o-chlorophenyl)-5-dimethylamino-indole
2-aminomethyl-3-(o-fluorophenyl)-5-methyl-indole
2-aminomethyl-3-(o-fluorophenyl)-5-methoxy-indole
2-aminomethyl-3-(o-fluorophenyl)-5-trifluoromethyl-indole 2-aminomethyl-3-(o-fluorophenyl)-5-methylsulfonyl-indole
2-aminomethyl-3-(o-fluorophenyl)-5-dimethylamino-indole
2-aminomethyl-1,5-dimethyl-3-phenyl-indole
2-aminomethyl-5-methoxy-1-methyl-3-phenyl-indole
2-aminomethyl-1-ethyl-5-methylsulfonyl-3-phenyl-indole
2-aminomethyl-1-methyl-5-methylsulfonyl-3-phenyl-indole
2-aminomethyl-5-ethylsulfonyl-1-methyl-3-phenyl-indole
2-aminomethyl-1-methyl-3-phenyl-5-trifluoromethyl-indole
2-aminomethyl-3-(o-fluorophenyl)-1-methyl-5-trifluoromethyl-indole
2-aminomethyl-3-(o-fluorophenyl)-1-methyl-5-methylsulfonyl-indole
2-aminomethyl-3-(o-chlorophenyl)-5-dimethylamino-1-methyl-indole
2-aminomethyl-5-dimethylamino-1-methyl-3-(o-trifluoromethyl)-indole
2-aminomethyl-5,6-dimethyl-3-phenyl-indole
2-aminomethyl-5,6-dimethoxy-3-phenyl-indole
2-aminomethyl-5-chloro-7-methyl-3-phenyl-indole
2-aminomethyl-5-methyl-7-nitro-3-phenyl-indole
2-aminomethyl-5-methyl-3-(p-tolyl)-indole
2-aminomethyl-5-methyl-3-(p-methoxyphenyl)-indole
2-aminomethyl-5-methyl-3-(p-nitrophenyl)-indole and the hydrochloride, hydrobromide, sulfate and acetate thereof.

The 2-aminomethyl compound (II) obtained by the above processes can be converted to the corresponding salt by treating the same with an acid, for example, mineral acid such as hydrochloric acid, hydrobromic acid, sulfuric acid and phosphoric acid, or organic acid such as acetic acid.

Further, it is also possible to N-alkylate the indole-2-carboxylic acid (thio)amide derivative according to a N-alkylation similar to that in the same of N-alkylation of indole-2-carboxylic acid derivative (VIIIe).

(V) Production of benzodiazepine derivatives (I)

In the process of the present invention, benzodiazepine derivatives (I) are produced by reacting a 2-aminomethylindole derivative (II) with an oxidizing agent.

In carrying out the process for preparing the benzodiazepine derivatives according to the present invention, an 2-aminomethylindole derivative (II) or its salt is reacted with an appropriate oxidizing agent, for example, ozone, hydrogen peroxide, peracid (e.g. performic acid, peracetic acid and perbenzoic acid), chromic acid and potassium permanganate. The oxidizng agent used in the process of the invention is not limited, however, only to those exemplified above. Chromic anhydride and ozone are preferred as oxidizing agent. The reaction is generally readily effected at room temperature. Higher or lower temperature is sometimes found more satisfactory.

The reaction may be carried out in the presence of a solvent. Choice of a solvent depends upon the oxidizing agents used, and is selected from water, acetone, carbon tetrachloride, acetic acid, sulfuric acid and other solvents. The oxidizing agent is used in a stoichiometric amount or more.

In the case which the oxidation is carried out using chromium trioxide in the presence of acetic acid, it is preferable to use 2–3 times an equimolar amount of chromic anhydride and to conduct the reaction at room temperature. A 2-aminomethylindole derivative or its salt such as hydrochloride, hydrobromide, sulfate, nitrate, acetate and the like is dissolved or suspended in a solvent and an oxidizing agent is added thereto with stirring. The reaction is generally completed within about 24 hours.

The desired benzodiazepine derivative can be separated from the reaction mixture in a crude form by extraction after neutralization or without neutralization and by evaporation to dryness. The product may be further purified, if desired, by recrystallization from an appropriate solvent such as ethanol, isopropanol and the like.

In the present invention, examples of benzodiazepine derivatives (I) include the following compound:

7-methyl-5-phenyl-1,3-dihydro-2H-1,4-benzodiazepine-2-one
7-methoxy-5-phenyl-1,3-dihydro-2H-1,4-benzodiazepine-2-one
8-methoxy-5-phenyl-1,3-dihydro-2H-1,4-benzodiazepine-2-one
8-methoxy-7-bromo-5-phenyl-1,3-dihydro-2H-1,4-benzodiazepine-2-one
7-trifluoromethyl-5-phenyl-1,3-dihydro-2H-1,4-benzodiazepine-2-one
6 (or 8)-trifluoromethyl-5-phenyl-1,3-dihydro-2H-1,4-benzodiazepine-2-one
7-methylsulfonyl-5-phenyl-1,3-dihydro-2H-1,4-benzodiazepine-2-one
7-ethylsulfonyl-5-phenyl-1,3-dihydro-2H-1,4-benzodiazepine-2-one
7-dimethylamino-5-phenyl-1,3-dihydro-2H-1,4-benzodiazepine-2-one
7-diethylamino-5-phenyl-1,3-dihydro-2H-1,4-benzodiazepine-2-one
7-piperidino-5-phenyl-1,3-dihydro-2H-1,4-benzodiazepine-2-one
5-(o-chlorophenyl)-7-methoxy-1,3-dihydro-2H-1,4-benzodiazepine-2-one
5-(o-chlorophenyl)-7-methyl-1,3-dihydro-2H-1,4-benzodiazepine-2-one
5-(o-chlorophenyl)-7-dimethylamino-1,3-dihydro-2H-1,4-benzodiazepine-2-one
5-(o-fluorophenyl)-7-methyl-1,3-dihydro-2H-1,4-benzodiazepine-2-one
5-(o-fluorophenyl)-7-methoxy-1,3-dihydro-2H-1,4-benzodiazepine-2-one
5-(o-fluorophenyl)-7-trifluoromethyl-1,3-dihydro-2H-1,4-benzodiazepine-2-one
5-(o-fluorophenyl)-7-methylsulfonyl-1,3-dihydro-2H-1,4-benzodiazepine-2-one
5-(o-fluorophenyl)-7-dimethylamino-1,3-dihydro-2H-1,4-benzodiazepine-2-one
1,7-dimethyl-5-phenyl-1,3-dihydro-2H-1,4-benzodiazepine-2-one
7-methoxy-1-methyl-5-phenyl-1,3-dihydro-2H-1,4-benzodiazepine-2-one
1-ethyl-7-methylsulfonyl-5-phenyl-1,3-dihydro-2H-1,4-benzodiazepine-2-one
1-methyl-7-methylsulfonyl-5-phenyl-1,3-dihydro-2H-1,4-benzodiazepine-2-one
7-ethylsulfonyl-1-methyl-5-phenyl-1,3-dihydro-2H-1,4-benzodiazepine-2-one
1-methyl-5-phenyl-7-trifluoromethyl-1,3-dihydro-2H-1,4-benzodiazepine-2-one
5-(o-fluorophenyl)-1-methyl-7-trifluorophenyl-1,3-dihydro-2H-1,4-benzodiazepine-2-one
5-(o-fluorophenyl)-1-methyl-7-methylsulfonyl-1,3-dihydro-2H-1,4-benzodiazepine-2-one
5-(o-chlorophenyl)-7-dimethylamino-1-methyl-1,3-dihydro-2H-1,4-benzodiazepine-2-one
7-dimethylamino-1-methyl-5-(o-trifluoromethyl)-1,3-dihydro-2H-1,4-benzodiazepine-2-one
7,8-dimethyl-5-phenyl-1,3-dihydro-2H-1,4-benzodiazepine-2-one
7,8-dimethoxy-5-phenyl-1,3-dihydro-2H-1,4-benzodiazepine-2-one
7-chloro-9-methyl-5-phenyl-1,3-dihydro-2H-1,4-benzodiazepine-2-one
7-methyl-9-nitro-5-phenyl-1,3-dihydro-2H-1,4-benzodiazepine-2-one
7-methyl-5-(p-tolyl)-1,3-dihydro-2H-1,4-benzodiazepine-2-one
7-methyl-5-(p-methoxylphenyl)-1,3-dihydro-2H-1,4-benzodiazopine-2-one 7-methyl-5-(p-nitrophenyl)-1,3-dihydro-2H-1,4-
benzodiazepine-2-one The benzodiazepine derivatives (I) obtained according to the above-mentioned process may also be isolated in the form of an acid addition salt by treatment with an acid, e.g. a mineral acid such as hydrochloric, sulfuric, nitric, phosphoric or chromic acid, or an organic acid such as maleic, fumaric, succinic, formic or acetic acid.

EXAMPLE 1

To a solution of 16.4 g. of phenylpyruvic acid in 350 ml. of ethanol, was added 10.7 g. of p-methylphenyl-hydrazine, and the reaction mixture was refluxed for 30 minutes.

After completion of the reaction, the solvent was removed by distillation to give an oily p-methylphenyl-hydrazone of phenylpyruvic acid almost quantitatively.

EXAMPLE 2

To a solution of 16.4 g. of phenylpyruvic acid in 350 ml. of ethanol, was added 12.3 g. of p-methoxyphenyl-hydrazine, and the reaction mixture was refluxed for 30 minutes. The solvent was distilled off under reduced pressure to give an oily p-methoxyphenylhydrazone of phenylpyruvic acid.

Similarly, the following compounds are prepared:

phenylpyruvic acid p-trifluoromethyl-phenylhydrazone
phenylpyruvic acid p-methylsulfonyl-phenylhydrazone
phenylpyruvic acid p-dimethylamino-phenylhydrazone
phenylpyruvic acid p-diethylamino-phenylhydrazone
phenylpyruvic acid p-(1'-piperazinyl)phenylhydrazone
phenylpyruvic acid 3,4-dimethyl-phenylhydrazone
phenylpyruvic acid 4-bromo-3-methoxy-phenylhydrazone
o-chlorophenylpyruvic acid p-methylphenylhydrazone
o-chlorophenylpyruvic acid p-methoxyphenylhydrazone
o-chlorophenylpyruvic acid p-dimethylamino-phenyl-
  hydrazone
o-fluorophenylpyruvic acid p-methyl-phenylhydrazone
o-fluorophenylpyruvic acid p-methoxy-phenylhydrazone
o-fluorophenylpyruvic acid p-trifluoromethyl-phenyl-
  hydrazone
o-fluorophenylpyruvic acid p-methylsulfonyl-phenyl-
  hydrazone
o-fluorophenylpyruvic acid p-dimethylamino-phenyl-
  hydrazone
phenylpyruvic acid N'-methyl-p-methylphenylhydrazone
phenylpyruvic acid N'-methyl-p-trifluoromethyl-
  phenylhydrazone
methyl phenylpyruvate p-methylphenylhydrazone
ethyl phenylpyruvate p-methylphenylhydrazone

EXAMPLE 3

Dry hydrogen chloride is passed into a solution of 82 g. of ethyl phenylpyruvate p-methylphenylhydrazone in 200 ml. of anhydrous ethanol. The mixture is stirred at 70°–75° C. for 1 hour. The reaction mixture is cooled with ice and the precipitate is collected by filtration, washed with water and dried to give ethyl 5-methyl-3-phenyl-indole-2-carboxylate, M.P. 125°–126° C.

EXAMPLE 4

Into a solution of 25.3 g. of p-methylphenyl-hydrazone of phenylpyruvic acid in 20 ml. of acetic acid, anhydrous hydrogen chloride gas was introduced, and the reaction mixture was then allowed to stand at room temperature for two hours.

The resultant precipitate was collected by filtration, and washed with water, and recrystallized from acetone-water to give 18 g. of 3-phenyl - 5 - methyl-indole-2-carboxylic acid. Melting point 227° C.

Similarly the following compounds are prepared:

6 (or 8)-methoxy-3-phenyl-indole-2-carboxylic acid
5-trifluoromethyl-3-phenyl-indole-2-carboxylic acid
5-methylsulfonyl-3-phenyl-indole-2-carboxylic acid
5-ethylsulfonyl-3-phenyl-indole-2-carboxylic acid
5-dimethylamino-3-phenyl-indole-2-carboxylic acid
5-diethylamine-3-phenyl-indole-2-carboxylic acid
5-piperidino-3-phenyl-indole-2-carboxylic acid
3-(o-chlorophenyl)-5-methyl-indole-2-carboxylic acid
3-(o-chlorophenyl)-5-methoxy-indole-2-carboxylic acid
3-(o-chlorophenyl)-5-dimethylamino-indole-2-carboxylic
  acid
3-(o-fluorophenyl)-5-methyl-indole-2-carboxylic acid
3-(o-fluorophenyl)-5-methoxy-indole-2-carboxylic acid
3-(o-fluorophenyl-5-trifluoromethyl-indole-2-carboxylic
  acid
3-(o-fluorophenyl)-5-methylsulfonyl-indole-2-carboxylic
  acid
1,5-dimethyl-3-phenyl-indole-2-carboxylic acid
1-methyl-3-phenyl-5-trifluoromethyl-indole-2-carboxylic
  acid
ethyl 5-methyl-3-phenyl-indole-2-carboxylate
methyl 5-methyl-3-phenyl-indole-2-carboxylate
tertiary butyl 5-methyl-3-phenyl-indole-2-carboxylate
ethyl 5-methyl-3-phenyl-indole-2-carboxylate
ethyl 3-phenyl-5-trifluoromethyl-indole-2-carboxylate
ethyl 5-methylsulfonyl-3-phenyl-indole-2-carboxylate
ethyl 5-ethyl-sulfonyl-3-phenyl-indole-2-carboxylate
ethyl 5-dimethylamino-3-phenyl-indole-2-carboxylate
ethyl 5-diethylamino-3-phenyl-indole-2-carboxylate
ethyl 3-(o-fluorophenyl)-5-methyl-indole-2-carboxylate
ethyl 3-(o-fluorophenyl)-5-methoxy-indole-2-carboxylate
ethyl 3-(o-fluorophenyl)-5-trifluoromethyl-indole-2-
  carboxylate
ethyl 3-(o-fluorophenyl)-5-methylsulfonyl-indole-2-
  carboxylate
ethyl 3-(o-chlorophenyl)-5-methoxy-indole-2-carboxylate
ethyl 3-(o-chlorophenyl)-5-dimethylamino-indole-2-
  carboxylate
ethyl 5-bromo-6-methoxy-3-phenyl-indole-2-carboxylate
ethyl 5-methyl-3-(p-tolyl)-indole-2-carboxylate

EXAMPLE 5

A solution of 26.9 g. of p-methoxyphenylhydrazone of phenylpyruvic acid in 30 ml. of acetic acid was heated at 75°–80° C. for 2 hours. After the reaction mixture was cooled, water was added to the mixture. The precipitate was collected by filtration, and recrystallized from acetone-water to give 19.2 g. of 3-phenyl-5-methoxy-indole-2-carboxylic acid as a colourless needle. Melting point 218° C.

EXAMPLE 6

To a solution of 18 g. of phenylpyruvic acid in 30 ml. of acetic acid, was added 10.7 g. of p-methylphenyl-hydrazine, and the reaction mixture was heated at 75°–80° C. for 3 hours. After cooling the reaction mixture, water was added to the mixture.

The precipitate was collected by filtration and recrystallized from acetone-water to give 18.2 g. of 3-phenyl-5-methyl-indole-2-carboxylic acid. Melting point 227° C.

EXAMPLE 7

To a solution of 18 g. of phenylpyruvic acid in 30 ml. of acetic acid, was added 12.3 g. of p-methoxyphenylhydrazine. The reaction mixture was heated at 75°–80° C. for 3 hours. After cooling the reaction mixture, water was added to the mixture.

The precipitate was collected by filtration and recrystallized from acetone-water to give 17.9 g. of 3-phenyl-5-methoxy-indole-2-carboxylic acid. Melting point 218° C.

Similarly the following compounds are prepared:

6 (or 8)-methoxy-3-phenyl-indole-2-carboxylic acid
5-trifluoromethyl-3-phenyl-indole-2-carboxylic acid
5-methylsulfonyl-3-phenyl-indole-2-carboxylic acid
5-ethylsulfonyl-3-phenyl-indole-2-carboxylic acid
5-dimethylamino-3-phenyl-indole-2-carboxylic acid
5-diethylamino-3-phenyl-indole-2-carboxylic acid
5-piperidino-3-phenyl-indole-2-carboxylic acid
3-(o-chlorophenyl)-5-methyl-indole-2-carboxylic acid 3-(o-chlorophenyl)-5-methoxy-indole-2-carboxylic acid
3-(o-chlorophenyl)-5-dimethylamino-indole-2-carboxylic acid
3-(o-fluorophenyl)-5-methyl-indole-2-carboxylic acid
3-(o-fluorophenyl)-5-methoxy-indole-2-carboxylic acid
3-(o-fluorophenyl)-5-trifluoromethyl-indole-2-carboxylic acid
3-(o-fluorophenyl)-5-methylsulfonyl-indole-2-carboxylic acid
1,5-dimethyl-3-phenyl-indole-2-carboxylic acid
1-methyl-3-phenyl-5-trifluoromethyl-indole-2-carboxylic acid
ethyl 5-methyl-3-phenyl-indole-2-carboxylate
methyl 5-methyl-3-phenyl-indole-2-carboxylate
ethyl 5-methyl-3-phenyl-indole-2-carboxylate
ethyl 3-phenyl-5-trifluoromethyl-indole-2-carboxylate
ethyl 5-methylsulfonyl-3-phenyl-indole-2-carboxylate
ethyl 5-ethyl-sulfonyl-3-phenyl-indole-2-carboxylate
ethyl 5-dimethylamino-3-phenyl-indole-2-carboxylate
ethyl 5-diethylamino-3-phenyl-indole-2-carboxylate

EXAMPLE 8

To a solution of 55 g. of ethyl α-benzylacetoacetate in 250 ml. of ethanol is added 85 ml. of 50% aqueous potassium hydroxide solution followed by 500 ml. of ice-water under cooling. To the ice-cooled mixture is added dropwise the diazonium salt solution prepared from 26.7 g. of p-toluidine, 100 ml. of conc. hydrochloric acid, 150 ml. of water and an aqueous solution of 17.9 g. of sodium nitrite in 60 ml. of water. The mixture is stirred at 5° C. for 1 hour and extracted with ether. The ethereal extract is dried over sodium sulfate and the solvent is removed. The oily residue is dissolved in 200 ml. of ethanol and dry gas hydrogen chloride is bubbled into the solution. An exothermic reaction ensures, and the mixture is kept at 70°–75° C. during bubbling. The mixture is allowed to stand for 2 hours. After cooling, the precipitate is collected by filtration, washed with water and dried to give ethyl 5-methyl-3-phenyl-indole-2-carboxylate. Recrystallization from ethanol gives the analytical sample, as colorless needles, M.P. 125°–126° C.

*Analysis.*—Calcd. for $C_{18}H_{17}O_2N$ (percent): C, 77.39; H, 6.13; N, 5.01. Found (percent): C, 77.53; H, 6.04; N, 5.01.

EXAMPLE 9

A mixture of 28.3 g. of p-anisidine, 95 mol. of conc. hydrochloric acid and 120 ml. of water is heated into a solution and then cooled below 0° C. To the mixture is added a solution of 16.5 g. of sodium nitrite in 50 ml. of water and the mixture is vigorously stirred, and extracted with ether. The ether, extract is dried over sodium sulfate and the solvent is removed. The oily residue is dissolved in 100 ml. of anhydrogen ethanol. Dry gaseous hydrogen chloride is passed into the solution for 50 minutes while the temperature is maintained at 70°–75° C. with intermittent cooling. The mixture is allowed to stand for 2 hours. After cooling on ice the precipitate is collected by filtration washed with ethanol followed by a wash with water and dried to give ethyl 5-methoxy-3-phenyl-indole-2-carboxylate. Two recrystallizations from ethanol give an analytical sample as colorless needles, M.P. 120°–121° C.

*Analysis.*—Calcd. for $C_{18}H_{17}O_3N$ (percent): C, 73.20; H, 5.80; N, 4.74. Found (percent): C, 73.07; H, 5.61; N, 4.50.

IR $\nu_{max.}^{Paraffin}$: 3270, 1655, 1600, 1530 cm.$^{-1}$

Similarly, the following compounds are prepared:

methyl 5-methyl-3-phenyl-indole-2-carboxylate
tertiary butyl 5-methyl-3-phenyl-indole-2-carboxylate
ethyl 3-phenyl-5-trifluoromethyl-indole-2-carboxylate
ethyl 5-methylsulfonyl-3-phenyl-indole-2-carboxylate
ethyl 5-ethyl-sulfonyl-3-phenyl-indole-2-craboxylate
ethyl 5-dimethylamino-3-phenyl-indole-2-carboxylate
ethyl 5-diethylamino-3-phenyl-indole-2-carboxylate
ethyl 3-(o-fluorophenyl)-5-methyl-indole-2-carboxylate
ethyl 3-(o-fluorophenyl)-5-methoxy-indole-2-carboxylate
ethyl 3-(o-fluorophenyl)-5-trifluoromethyl-indole-2-carboxylate
ethyl 3-(o-fluroopheynl)-5-methylsulfonyl-indole-2-carboxylate
ethyl 3-(o-chlorophenyl)-5-methoxy-indole-2-carboxylate
ethyl 3-(o-chlorophenyl)-5-dimethylamino-indole-2-carboxylate
ethyl 5-bromo-6-methoxy-3-phenyl-indole-2-carboxylate
ethyl 5-methyl-3-(p-tolyl)-indole-2-carboxylate.

EXAMPLE 10

To a suspension of 1.2 g. of sodium hydride in 10 ml. of dimethylformamide was added a solution of 14.7 g. of ethyl 3-phenyl-5-methoxy-indole-2-carboxylate in 40 ml. of dimethylformamide.

The mixture was stirred at 20° C. for 1 hour, and then 8 g. of methyliodide was added to the mixture. The reaction mixture was stirred at room temperature for 5 hours.

The resulting mixture was poured into water, and extracted with ether.

The organic layer was washed with water and dried with sodium sulfate.

The solvent was distilled off to give oily product. The oily product was crystallized from ethanol-hexane to give 11.6 g. of ethyl 1-methyl-3-phenyl-5-methoxy-indole-2-carboxylate. Melting point 45°–50° C.

EXAMPLE 11

To a suspension of 1.2 g. of sodium hydride in 10 ml. of dimethylformamide was added, a solution of 13.9 g. of ethyl 3-phenyl-5-methyl-indole-2-carboxylate in 40 ml. of dimethylformamide.

The mixture was stirred at room temperature for 1 hour, and then 8 g. of methyliodide was added to the mixture. The reaction mixture was stirred at room temperature for 5 hours. The reaction mixture was poured into water, and extracted with ether. The organic layer was washed with water and dried with sodium sulfate.

The solvent was distilled off to give oily product. The oily product was recrystallized from ethanol-hexane to give 10.8 g. of ethyl 1,5-dimethyl-3-phenyl-indole-2-carboxylate. Melting point 48°–52° C.

Similarly, the following compounds are prepared:

methyl 1,5-dimethyl-3-phenyl-indole-2-carboxylate
ethyl 3-phenyl-1-methyl-trifluoromethyl-indole-2-carboxylate
ethyl 1-methyl-5-methylsulfonyl-3-phenyl-indole-2-carboxylate
ethyl 5-ethylsulfonyl-1-methyl-3-phenyl-indole-2-carboxylate
ethyl 5-dimethylamino-1-methyl-3-phenyl-indole-2-carboxylate
ethyl 5-diethylamino-1-methyl-3-phenyl-indole-
ethyl 3-(o-fluorophenyl-1,5-dimethyl-indole-2-carboxylate
ethyl 3-(o-fluorophenyl)-5-methoxy-1-methyl-indole-2-carboxylate
ethyl 3-(o-fluorophenyl)-1-methyl-5-trifluoromethyl-indole-2-carboxylate
ethyl 3-(o-fluorophenyl)-1-methyl-5-methylsulfonyl-indole-2-carboxylate
ethyl 3-(o-chlorophenyl)-1-methyl-5-methoxy-indole-2-carboxylate
ethyl 3-(o-chlorophenyl)-5-dimethylamino-1-methyl-indole-2-carboxylate
ethly 5-bromo-6-methoxy-1-methyl-3-phenyl-indole-2-carboxylate
ethyl 1,5-dimethyl-3-(p-tolyl)-indole-2-carboxylate
1,5-dimethyl-3-phenyl-indole-2-carboxylic acid
5-methoxy-1-methyl-3-phenylindole2-carboxylic acid
6 (or 8)-methoxy-1-methyl-3-phenyl-indole-2-carboxylic acid 1-methyl-5-trifluoromethyl-3-phenyl-indole-2-carboxylic acid
1-methyl-5-methylsulfonyl-3-phenyl-indole-2-carboxylate
1-ethyl-5-methylsulfonyl-3-phenyl-indole-2-carboxylic acid
1-methyl-5-ethylsulfonyl-3-phenyl-indole-2-carboxylic acid
5-diethylamino-1-methyl-3-phenyl-indole-2-carboxylic acid 2-carboxylate
5-dimethylamino-1-ethyl-3-phenyl-indole-1-methyl-5-piperidino-3-phenyl-indole-2-carboxylic acid
3-(o-chlorophenyl)-1,5-dimethyl-indole-2-carboxylic acid
3-(o-chlorophenyl)-5-methoxy-1-methyl-indole-2-carboxylic acid
3-(o-chlorophenyl)-5-dimethylamino-1-methyl-indole-2-carboxylic acid
3-(o-fluorophenyl)-1,5-dimethyl-indole-2-carboxylic acid
3-(o-fluorophenyl)-5-methoxy-1-indole-2-carboxylic acid
3-(o-fluorophenyl)-1-methyl-5-trifluoromethyl-indole-2-carboxylic acid
3-(o-fluorophenyl)-1-methyl-5-methylsulfonyl-indole-2-carboxylate
1-ethyl-5-methyl-3-phenyl-indole-2-carboxylic acid.

EXAMPLE 12

A mixture of 20 g. of ethyl 5-methoxy-3-phenyl-indole-2-carboxylate, 7.6 g. of sodium hydroxide and 250 ml. of ethanol is heated under reflux for 2 hours. The mixture is cooled to 0° C. and the precipitate is collected by filtration, dissolved in 120 ml. of water, and acidified with 7 ml. of conc. hydrochloric acid. The precipitate is collected by filtration, washed with water and dried to give 16.5 g. of 5-methoxy-3-phenyl-indole-2-carboxylic acid as a white solid, M.P. 215° C. (decomp.).

Recrystallization from acetone-water gives the product having M.P. 218° C. (decomp.).

Analysis.—Calcd. for $C_{16}H_{13}O_3N$ (percent): C, 71.90; H, 4.90; N, 5.24. Found (percent): C, 71.66; H, 4.73; N, 5.18.

EXAMPLE 13

A mixture of 20 g. of ethyl 5-methyl-3-phenyl-indole-2-carboxylate, 8.1 g. of potassium hydroxide and 250 ml. of ethanol is heated under reflux for 2 hours. After the solvent is removed, the residue is dissolved in 150 ml. of water, and acidified with hydrochloric acid under cooling. The precipitate is collected by filtration, washed with water and dried to give 5-methyl-3-phenyl-indole-2-carboxylic acid quantitatively.

Recrystallization from aqueous acetone gives colorless needles, M.P. 227° C. (decomp.)

Analysis.—Calcd. for $C_{16}H_{13}O_2N$ (percent): C, 76.47; H, 5.22; N, 5.57. Found (percent): C, 76.70; H, 5.06; N, 5.58.

Similarly, the following compounds are prepared:

6 (or 8)-methoxy-3-phenyl-indole-2-carboxylic acid
5-trifluoromethyl-3-phenyl-indole-2-carboxylic acid
5-methylsulfonyl-3-phenyl-indole-2-carboxylic acid
5-ethylsulfonyl-3-phenyl-indole-2-carboxylic acid
5-dimethylamino-3-phenyl-indole-2-carboxylic acid
5-diethylamino-3-phenyl-indole-2-carboxylic acid
5-piperidino-3-phenyl-indole-2-carboxylic acid
3-(o-chlorophenyl)-5-methyl-indole-2-carboxylic acid
3-(o-chlorophenyl)-5-methoxy-indole-2-carboxylic acid
3-(o-chlorophenyl)-5-dimethylamino-indole-2-carboxylic acid
3-(o-fluorophenyl)-5-methyl-indole-2-carboxylic acid
3-(o-fluorophenyl)-5-methoxy-indole-2-carboxylic acid
3-(o-fluorophenyl)-5-trifluoromethyl-indole-2-carboxylic acid
3-(o-fluorophenyl)-5-methylsulfonyl-indole-2-carboxylic acid
1,5-dimethyl-3-phenyl-indole-2-carboxylic acid
1-methyl-3-phenyl-5-trifluoromethyl-indole-2-carboxylic acid

EXAMPLE 14

A mixture of 18 g. of 5-methyl-3-phenyl-indole-2-carboxylic acid and 59.5 g. of thionyl chloride is refluxed for 1 hour. After the reaction is complete, excess thionyl chloride is removed under reduced pressure and the residue is suspended in dry tetrahydrofuran. Gaseous ammonia is bubbled into the suspension for 2 hours under ice cooling with stirring. Stirring is continued overnight under ice cooling. The mixture is filtered and the filtrate is concentrated to dryness under reduced pressure to a syrup which is crystallized by filtration with ether to give 13 g. of 5-methyl-3-phenyl-indole-2-carboxamide.

Recrystallization from acetone-water gives an analytical sample, M.P. 222°–223° C.

Analysis.—Calcd. for $C_{16}H_{14}CN_2$ (percent): C, 76.78; H, 5.64; N, 11.19. Found (percent): C, 76.56; H, 5.44; N, 10.93.

IR $\nu_{max.}^{Paraffin}$: 3430, 3158 (broad), 1660, 1590 cm.$^{-1}$

EXAMPLE 15

A mixture of 16 g. of 5-methoxy-3-phenyl-indole-2-carboxylic acid, 20 ml. of benzene and 21.4 g. of thionyl chloride is heated under reflux for 1.5 hours. The solvent and excess of thionyl chloride are removed under reduced pressure. To the residue is added 100 ml. of anhydrous ether and 350 ml. of tetrahydrofuran, and gaseous ammonia is bubbled into the mixture for 2 hours under ice cooling. The mixture is stirred overnight at room temperature and filtered. The filtrate is concentrated to dryness under reduced pressure and addition of ether to the residue given 11.5 g. of 5-methoxy-3-phenyl-indole-2-carboxamide, M.P. 180°–192° C.

IR $\nu_{max.}^{Paraffin}$: 3420, 3150 (broad), 1650, 1580 cm.$^{-1}$

Similarly the following compounds are prepared:

6 (or 8)-methoxy-3-phenyl-indole-2-carboxamide
5-trifluoromethyl-3-phenyl-indole-2-carboxamide
5-methylsulfonyl-3-phenyl-indole-2-carboxamide
5-ethylsulfonyl-3-phenyl-indole-2-carboxamide
5-dimethylamino-3-phenyl-indole-2-carboxamide
5-diethylamino-3-phenyl-indole-2-carboxamide
5-piperidino-3-phenyl-indole-2-carboxamide
3-(o-chlorophenyl)-5-methyl-indole-2-carboxamide
3-(o-chlorophenyl)-5-methoxy-indole-2-carboxamide
3-(o-chlorophenyl)-5-dimethylamino-indole-2-carboxamide
3-(o-fluorophenyl)-5-methyl-indole-2-carboxamide
3-(o-fluorophenyl)-5-methoxy-indole-2-carboxamide
3-(o-fluorophenyl)-5-trifluoromethyl-indole-2-carboxamide
3-(o-fluorophenyl)-5-methylsulfonyl-indole-2-carboxamide
1,5-dimethyl-3-phenyl-indole-2-carboxamide
1-methyl-3-phenyl-5-trifluoromethyl-indole-2-carboxamide
5-methoxy-1-methyl-3-phenyl-indole-2-carboxamide
1-ethyl-5-methylsulfonyl-3-phenyl-indole-2-carboxamide
1-methyl-5-methylsulfonyl-3-phenyl-indole-2-carboxamide
5-ethylsulfonyl-1-methyl-3-phenyl-indole-2-carboxamide
1-methyl-3-phenyl-5-trifluoromethyl-indole-2-carboxamdie
3-(o-fluorophenyl)-1-methyl-5-trifluoromethyl-indole-2-carboxamide
3-(o-fluorophenyl)-1-methyl-5-methylsulfonyl-indole-2-carboxamide
3-(o-chlorophenyl)-5-dimethylamino-1-methyl-indole-2-carboxamide
5-dimethylamino-1-methyl-3-(o-trifluoromethyl)-indole-2-carboxamide
5,6-dimethyl-3-phenyl-indole-2-carboxamide
5,6-dimethoxy-3-phenyl-indole-2-carboxamide 5-chloro-7-methyl-3-phenyl-indole2-carboxamide
5-methyl-7-nitro-3-phenyl-indole-2-carboxamide
5-methyl-3-(p-tolyl)-indole-2-carboxamide
5-methyl-3-(p-methoxyphenyl)-indole-2-carboxamide
5-methyl-3-(p-nitrophenyl)-indole-2-carboxamide.

EXAMPLE 16

To a suspension of 0.25 g. of sodium hydride in 10 ml. of dimethylformamide was added a solution of 2.5 g. of 5-methyl-3-phenyl-indole-2-carboxamide in 30 ml. of dimethylformamide. The mixture was stirred at room temperature for 1 hour, and then 2 g. of methyliodide was added to the mixture. The mixture was stirred at 40° C. for 4 hours.

The resultant mixture was poured into water, and extracted with chloroform.

The organic layer was washed with water and dried with sodium sulfate. The solvent was distilled off. The residue was crystallized from ethanol to give 1,5-dimethyl-3 - phenyl-indole - 2-carboxamide. Melting point 188°–191° C.

EXAMPLE 17

To a suspension of 0.25 g. of sodium hydride in 5 ml. of dimethylformamide was added a solution of 2.6 g. of 5 - methoxy-3-phenyl-indole-2-carboxamide in 30 ml. of dimethylformamide. The mixture was stirred at 20° C. for 1 hour and then 2 g. of methyliodide was added to the mixture. The reaction mixture was stirred at 30° C. for 6 hours.

The resultant mixture was poured into water, and extracted with chloroform. The organic layer was washed with water, and dried with sodium sulfate.

The solvent was distilled off.

The residue was crystallized from ethanol to give 5-methoxy - 1-methyl-3-phenyl-indole-2-carboxamide. Melting point 152°–155° C.

Similarly, the following compounds are prepared:

1-methyl-3-phenyl-5-trifluoromethyl-indole-2-carboxamide
5-methoxy-1-methyl-3-phenyl-indole-2-carboxamide
1-ethyl-5-methylsulfonyl-3-phenyl-indole-2-carboxamide
1-methyl-5-methylsulfonyl-3-phenyl-indole-2-carboxamide
5-ethylsulfonyl-1-methyl-3-phenyl-indole-2-carboxamide
1-methyl-3-phenyl-5-trifluoromethyl-indole-2-carboxamide
3-(o-fluorophenyl)-1-methyl-5-trifluoromethyl-indole-2-carboxamide
3-(o-fluorophenyl)-1-methyl-5-methylsulfonyl-indole-2-carboxamide
3-(o-chlorophenyl)-5-dimethylamino-1-methyl-indole-2-carboxamide.

EXAMPLE 18

A mixture of 2 g. of 5-methyl-3-phenyl-indole-2-carboxamide and 10 g. of phosphorous oxychloride was refluxed for 15 minutes.

The ice-cold reaction mixture was filtered, washed with cold water and dried to give 1. g. of 5-methyl-3-phenyl-indole-2-carbonitrile, M.P. 194°–197° C.

EXAMPLE 19

A mixture of 2 g. of 5-methoxy-3-phenyl-indole-2-carboxamide and 10 g. of phosphorous oxychloride was heated under reflux for 15 minutes.

The ice-cold reaction mixture was filtered, washed with ice-water and dried to give 1.5 g. of 5-methoxy-3-phenyl-indole-2-carbonitrile, M.P. 184°–188° C.

Similarly the following compounds are prepared:

6 (or 8)-methoxy-3-phenyl-indole-2-carbonitrile
5-trifluoromethyl-3-phenyl-indole-2-carbonitrile
5-methylsulfonyl-3-phenyl-indole-2-carbonitrile
5-ethylsulfonyl-3-phenyl-indole-2-carbonitrile
5-dimethylamino-3-phenyl-indole-2-carbonitrile
5-diethylamino-3-phenyl-indole-2-carbonitrile
5-piperidino-3-phenyl-indole-2-carbonitrile
3-(o-chlorophenyl)-5-methyl-indole-2-carbonitrile
3-(o-chlorophenyl)-5-methoxy-indole-2-carbonitrile
3-(o-chlorophenyl)-5-dimethylamino-indole-2-carbontrile
3-(o-fluorophenyl)-5-methyl-indole-2-carbonitrile
3-(o-fluorophenyl)-5-methoxy-indole-2-carbonitrile
3-(o-fluorophenyl)-5-trifluoromethyl-indole-2-carbonitrile
3-(o-fluorophenyl)-5-methylsulfonyl-indole-2-carbonitrile
1-methyl-3-phenyl-5-trifluoromethyl-indole-2-carbonitrile
5-methoxy-1-methyl-3-phenyl-indole-2-carbonitrile
1-ethyl-5-methylsulfonyl-3-phenyl-indole-2-carbontrile
1-methyl-5-methylsulfonyl-3-phenyl-indole-2-carbonitrile
5-ethylsulfonyl-1-methyl-3-phenyl-indole-2-carbonitrile
1-methyl-3-phenyl-5-trifluoromethyl-indole-2-carbonitrile
3-(o-fluorophenyl)-1-methyl-5-trifluoromethyl-indole-2-carbonitrile
3-(o-fluorophenyl)-1-methyl-5-methylsulfonyl-indole-2-carbonitrile
3-(o-chlorophenyl)-5-dimethylamino-1-methyl-indole-2-carbonitrile
5-dimethylamino-1-methyl-3-(o-trifluoromethyl)-indole-2-carbonitrile
5,6-dimethyl-3-phenyl-indole-2-carbontrile
5,6-dimethoxy-3-phenyl-indole-2-carbonitrile
5-chloro-7-methyl-3-phenyl-indole-2-carbonitrile
5-methyl-7-nitro-3-phenyl-indole-2-carbonitrile
5-methyl-3-(p-tolyl-indole-2-carbonitrile
5-methyl-3-(p-methoxyphenyl)-indole-2-carbonitrile
5-methyl-3-(p-nitrophenyl)-indole-2-carbonitrile

EXAMPLE 20

To a mixture of 0.9 g. of 5-methyl-3-phenyl-indole-2-carbonitrile, 7 ml. of acetone and 0.7 ml. of 70% aqueous potassium hydroxide was added 0.7 ml. of dimethyl sulfate and the mixture was stirred at room temperature for 2 hours. After removing the acetone by distillation under reduced pressure. The residue was treated with water, filtered, washed with water and dried to give 1,5-dimethyl - 3-phenyl-indole-2-carbonitrile. Melting point 120°–128° C.

EXAMPLE 21

To a mixture of 1.0 g. of 5-methoxy-3-phenyl-indole-2-carbonitrile, 10 ml. of acetone and 0.8 ml. of 70% aqueous potassium hydroxide was added 0.8 ml. of dimethylsulfate and the mixture was stirred at room temperature for 2 hours.

After removing the acetone by distillation under reduced pressure. The residue was treated with water, filtered, washed with water and dried to give 5-methoxy-1-methyl - 3 - phenyl-indole-2-carbonitrile. Melting point 103°–110° C.

Similarly the following compounds are prepared:

1-methyl-3-phenyl-5-trifluoromethyl-indole-2-carbonitrile
5-methoxy-1-methyl-3-phenyl-indole-2-carbonitrile
1-ethyl-5-methylsulfonyl-3-phenyl-indole-2-carbonitrile
1-methyl-5-methylsulfonyl-3-phenyl-indole-2-carbonitrile
5-ethylsulfonyl-1-methyl-3-phenyl-indole-2-carbonitrile
1-methyl-3-phenyl-5-trifluoromethyl-indole-2-carbonitrile
3-(o-fluorophenyl)-1-methyl-5-trifluoromethyl-indole-2-carbonitrile
3-(o-fluorophenyl)-1-methyl-5-methylsulfonyl-indole-2-carbonitrile
3-(o-chlorophenyl)-5-dimethylamino-1-methyl-indole-2-carbonitrile
5-dimethylamino-1-methyl-3-(o-trifluoromethyl)-indole-2-carbonitrile.

EXAMPLE 22

To a suspension of 8.5 g. of lithium aluminium hydride in 400 ml. of anhydrous ether is added portionwise 7 g. of 5-methyl-3-phenyl-indole-2-carboxamide and the mixture is refluxed for 4 hours. After cooling, the excess hydride is decomposed by addition of ethyl acetate and moist ether, followed by water. The resultant mixture is filtered and the filtrate is acidified with 50 ml. of 12% hydrochloric acid. The precipitate is collected by filtration and dried to give 2-aminomethyl-5-methyl-3-phenyl-indole hydrochloride. Recrystallization from ethanol gives colorless needles, M.P. 240° C. (decomp.).

EXAMPLE 23

A mixture of 11.1 g. of lithium aluminium hydride, 400 ml. of anhydrous tetrahydrofuran and 9.7 g. of 5-methoxy-3-phenyl-indole-2-carboxamide is heated for 4 hours under reflux with stirring. After standing at room temperature overnight, 130 ml. of water is added dropwise to the reaction mixture. The resulting mixture is filtered and the filtrate is concentrated to dryness under reduced pressure. The residue is dissolved in 40 ml. of ethanol and treated with ethanolic hydrogen chloride. After standing at room temperature for 2 hours, the mixture is concentrated and the ether is added. After cooling, the precipitate is collected by filtration to give 2-aminomethyl-5-methoxy-3-phenyl-indole hydrochloride, M.P. >300° C.

Similarly, the following compounds are prepared:

2-aminomethyl-6 (or 4)-methoxy-3-phenyl-indole
2-aminomethyl-5-bromo-6 (or 4)-methoxy-3-phenyl-indole
2-aminomethyl-3-phenyl-5-trifluoromethyl-indole
2-aminomethyl-3-phenyl-6 (or 4)-trifluoromethyl-indole
2-aminomethyl-5-methylsulfonyl-3-phenyl-indole
2-aminomethyl-5-ethylsulfonyl-3-phenyl-indole
2-aminomethyl-5-dimethylamino-3-phenyl-indole
2-aminomethyl-5-diethylamino-3-phenyl-indole
2-aminomethyl-3-phenyl-5-piperidino-indole
2-aminomethyl-3-(o-chlorophenyl)-5-methyl-indole
2-aminomethyl-3-(o-chlorophenyl)-5-methoxy-indole
2-aminomethyl-3-(o-chlorophenyl)-5-dimethylamino-indole
2-aminomethyl-3-(o-fluorophenyl)-5-methyl-indole
2-aminomethyl-3-(o-fluorophenyl)-5-methoxy-indole
2-aminomethyl-3-(o-fluorophenyl)-5-trifluoromethyl-indole
2-aminomethyl-3-(o-fluorophenyl)-5-methylsulfonyl-indole
2-aminomethyl-3-(o-fluorophenyl)-5-dimethylamino-indole
2-aminomethyl-1,5-dimethyl-3-phenyl-indole
2-aminomethyl-5-methoxy-1-methyl-3-phenyl-indole
2-aminomethyl-1-ethyl-5-methylsulfonyl-3-phenyl-indole
2-aminomethyl-1-methyl-5-methylsulfonyl-3-phenyl-indole
2-aminomethyl-5-ethylsulfonyl-1-methyl-3-phenyl-indole
2-aminomethyl-1-methyl-3-phenyl-5-trifluoromethyl-indole
2-aminomethyl-3-(o-fluorophenyl)-1-methyl-5-trifluoromethyl-indole
2-aminomethyl-3-(o-fluorophenyl)-1-methyl-5-methylsulfonyl-indole
2-aminomethyl-3-(o-chlorophenyl)-5-dimethylamino-1-methyl-indole
2-aminomethyl-5-dimethylamino-1-methyl-3-(o-trifluoromethyl)-indole
2-aminomethyl-5,6-dimethyl-3-phenyl-indole
2-aminomethyl-5,6-dimethoxy-3-phenyl-indole
2-aminomethyl-5-chloro-7-methyl-3-phenyl-indole
2-aminomethyl-5-methyl-7-nitro-3-phenyl-indole
2-aminomethyl-5-methyl-3-(p-tolyl)-indole
2-aminomethyl-5-methyl-3-(p-methoxyphenyl)-indole
2-aminomethyl-5-methyl-3-(p-nitrophenyl)-indole and the hydrochlorides, hydrobromides, sulfate and acetate thereof.

EXAMPLE 24

To a suspension of 2 g. of lithium-aluminum hydride in 300 ml. of dry ether, was added dropwise 3.5 g. of 5-methoxy-1-methyl-3-phenyl-indole-2-carbonitrile with stirring. After addition, the mixture was refluxed for 4 hours.

The reaction mixture was cooled with ice, water was added dropwise to the mixture. The ether layer was separated, dried with sodium sulfate and then the solvent was distilled off to give 3.2 g. of 2-aminomethyl-5-methoxy-3-phenyl-indole. To a solution of 2-aminomethyl-5-methoxy-1-methyl-3-phenyl-indole in ether, was added 10% hydrochloric acid and the mixture was shaken.

The precipitate was collected by filtration to give 2-aminomethyl-5-methoxy-1-methyl-3-phenyl-indole hydrochloride. Recrystallization from ethanol gave crystals having a melting point of 300° C. above.

EXAMPLE 25

To a suspension of 2 g. of lithium-aluminum hydride in 300 ml. of ether was added dropwise 3.6 g. of 1,5-dimethyl-3-phenyl-indole-2-carbonitrile with stirring. After addition, the reaction mixture was refluxed for 4 hours. The reaction mixture was cooled with ice, water was added to the mixture. The ether layer was separated, dried with sodium sulfate. To the ether solution was added 10% hydrochloric acid and the mixture was shaken vigorously.

The precipitate was cooled by filtration to give 2-aminomethyl-1,5-dimethyl-3-phenyl-indole hydrochloride. Melting point 260°–270° C. (decomp.).

Similarly, the following compounds are prepared:

2-aminomethyl-6 (or 4)-methoxy-3-phenyl-indole
2-aminomethyl-5-bromo-6 (or 4)-methoxy-3-phenyl-indole
2-aminomethyl-3-phenyl-5-trifluoromethyl-indole
2-aminomethyl-3-phenyl-6 (or 4)-trifluoromethyl-indole
2-aminomethyl-5-methylsulfonyl-3-phenyl-indole
2-aminomethyl-5-ethylsulfonyl-3-phenyl-indole
2-aminomethyl-5-dimethylamino-3-phenyl-indole
2-aminomethyl-5-diethylamino-3-phenyl-indole
2-aminomethyl-3-phenyl-5-piperidino-indole
2-aminomethyl-3-(o-chlorophenyl)-5-methyl-indole
2-aminomethyl-3-(o-chlorophenyl)-5-methoxy-indole
2-aminomethyl-3-(o-chlorophenyl)-5-dimethylamino-indole
2-aminomethyl-3-(o-fluorophenyl)-5-methyl-indole
2-aminomethyl-3-(o-fluorophenyl)-5-methoxy-indole
2-aminomethyl-3-(o-fluorophenyl)-5-trifluoromethyl-indole
2-aminomethyl-3-(o-fluorophenyl)-5-methylsulfonyl-indole
2-aminomethyl-3-(o-fluorophenyl)-5-dimethylamino-indole
2-aminomethyl-5-methoxy-1-methyl-3-phenyl-indole
2-aminomethyl-1-ethyl-5-methylsulfonyl-3-phenyl-indole
2-aminomethyl-1-methyl-5-methylsulfonyl-3-phenyl-indole
2-aminomethyl-5-ethylsulfonyl-1-methyl-3-phenyl-indole
2-aminomethyl-1-methyl-3-phenyl-5-trifluoromethyl-indole
2-aminomethyl-3-(o-fluorophenyl)-1-methyl-5-trifluoromethyl-indole
2-aminomethyl-3-(o-fluorophenyl)-1-methyl-5-methylsulfonyl-indole
2-aminomethyl-3-(o-chlorophenyl)-5-dimethylamino-1-methyl-indole
2-aminomethyl-5-dimethylamino-1-methyl-3-(o-trifluoromethyl)-indole
2-aminomethyl-5,6-dimethyl-3-phenyl-indole
2-aminomethyl-5,6-dimethoxy-3-phenyl-indole
2-aminomethyl-5-chloro-7-methyl-3-phenyl-indole
2-aminomethyl-5-methyl-7-nitro-3-phenyl-indole
2-aminomethyl-5-methyl-3-(p-tolyl)-indole 2-aminomethyl-5-methyl-3-(p-methoxyphenyl)-indole
2-aminomethyl-5-methyl-3-(p-nitrophenyl)-indole.

EXAMPLE 26

A mixture of 1.0 g. of 2-aminomethyl-5-methyl-3-phenyl-indole hydrochloride, 40 ml. of glacial acetic acid and 25 ml. of 30% hydrogen peroxide is stirred at room temperature. After the reaction is complete, the reaction mixture is made basic with ammonia water and extracted with ether. The ether extract is extracted wih 10% aqueous hydrochloric acid, basified wih ammonia water, extracted with ether, and dried over sodium sulfate, and the solvent is removed under reduced pressure. The residue is recrystallized from acetone to give 7-methyl-5-phenyl-1,3-dihydro-2H-1,4-benzodiazepine - 2 - one, M.P. 209°–210° C.

EXAMPLE 27

A solution of 3 g. of chromic anhydride in 3 ml. of water under cooling is added dropwise to a stirred mixture of 3 g. of 2-aminomethyl-3-phenyl-5-methyl-indole hydrochloride and 30 ml. of glacial acetic acid. The mixture is stirred at room temperature overnight. The reaction mixture is diluted with water, basified with ammonia water and extracted with ether. The ether extract is dried over sodium sulfate and the solvent is removed under reduced pressure. The residue is recrystallized from acetone to give 7-methyl-5-phenyl-1,3-dihydro-2H-1,4-benzodiazepine-2-one, M.P. 210°–211° C.

EXAMPLE 28

To a mixture of 3 g. of 2-aminomethyl-5-methoxy-1-methyl-3-phenyl-indole hydrochloride and 30 ml. of acetic acid was added dropwise a solution of 3 g. of chromic anhydride in 3 ml. of water at 10° C. The mixture is stirred at room temperature overnight. Reaction mixture was poured into large amount of water, made alkaline with aqueous ammonia, and extracted with ether.

The ether layer was dried over sodium sulfate, and the solvent was removed by distillation.

The residue was crystallized from isopropanol to give 7 - methoxy-1-methyl-5-phenyl-1,3-dihydro-2H-1,4-benzodiazepine-2-one having a melting point, 112°–120° C.

Similarly, the following compounds are prepared:

8-methoxy-5-phenyl-1,3-dihydro-2H-1,4-benzodiazepine-2-one
8-methoxy-7-bromo-5-phenyl-1,3-dihydro-2H-1,4-benzodiazepine-2-one
6 (or 8)-tifluoromethyl-5-phenyl-1,3-dihydro-2H-1,4-benzodiazepine-2-one
7-methylsulfonyl-5-phenyl-1,3-dihydro-2H-1,4-benzodiazepine-2-one
7-dimethylamino-5-phenyl-1,3-dihydro-2H-1,4-benzodiazepine-2-one
7-diethylamino-5-phenyl-1,3-dihydo-2H-1,4-benzodiazepine-2-one
7-piperidino-5-phenyl-1,3-dihydro-2H-1,4-benzodiazepine-2-one
5-(o-chlorophenyl)-7-methoxy-1,3-dihydro-2H-1,4-benzodiazepine-2-one
5-(o-chlorophenyl)-7-methyl-1,3-dihydro-2H-1,4-benzodiazepine-2-one
5-(o-chlorophenyl)-7-dimethylamino-1,3-dihydro-2H-1,4-benzodiazepine-2-one
5-(o-fluorophenyl)-7-methyl-1,3-dihydro-2H-1,4-benzodiazepine-2-one
5-(o-fluorophenyl)-7-methoxy-1,3-dihydro-2H-1,4-benzodiazepine-2-one
5-(o-fluorophenyl)-7-methylsulfonyl-1,3-dihydro-2H-1,4-benzodiazepine-2-one
5-(o-fluorophenyl)-7-dimethylamino-1,3-dihydro-2H-1,4-benzodiazepine-2-one
1,7-dimethyl-5-phenyl-1,3-dihydro-2H-1,4-benzodiazepine-2-one
7-methoxy-1-methyl-5-phenyl-1,3-dihydro-2H-1,4-benzodiazepine-2-one
1-ethyl-7-methylsulfonyl-5-phenyl-1,3-dihydro-2H-1,4-benzodiazepine-2-one
1-methyl-7-methylsulfonyl-5-phenyl-1,3-dihydro-2H-1,4-benzodiazepine-2-one
7-ethylsulfonyl-1-methyl-5-phenyl-1,3-dihydro-2H-1,4-benzodiazepine-2-one
1-methyl-5-phenyl-7-trifluoromethyl-1,3-dihydro-2H-1,4-benzodiazepine-2-one
5-(o-fluorophenyl)-1-methyl-7-trifluorphenyl-1,3-dihydro-2H-1,4-benzodiazepine-2-one
5-(o-fluorophenyl)-1-methyl-7-methylsulfonyl-1,3-dihydro-2H-1,4-benzodiazepine-2-one
5-(o-chlorophenyl)-7-dimethylamino-1-methyl-1,3-dihydro-2H-1,4-benzodiazepine-2-one
7-dimethylamino-1-methyl-5-(o-trifluoromethyl)-1,3-dihydro-2H-1,4-benzodiazepine-2-one
7,8-dimethyl-5-phenyl-1,3-dihydro-2H-1,4-benzodiazepine-2-one
7,8-dimethoxy-5-phenyl-1,3-dihydro-2H-1,4-benzodiazepine-2-one
7-chloro-9-methyl-5-phenyl-1,3-dihydro-2H-1,4-benzodiazepine-2-one
7-methyl-9-nitro-5-phenyl-1,3-dihydro-2H-1,4-benzodiazepine-2-one
7-methyl-5-(p-tolyl)-1,3-dihydro-2H-1,4-benzodiazepine-2-one
7-methyl-5-(p-methoxyphenyl)-1,3-dihydro-2H-1,4-benzodiazepine-2-one
7-methyl-5-(p-nitrophenyl)-1,3-dihydro-2H-1,4-benzodiazepine-2-one.

We claim:

1. A process for preparing a benzodiazepine or acid addition salt thereof represented by the formula,

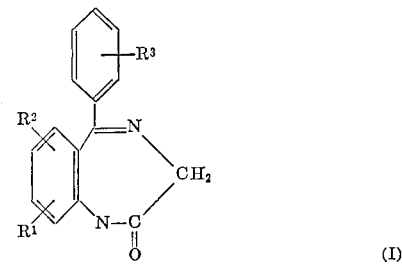

wherein R is a hydrogen atom or an alkyl group having 1 to 4 carbon atoms; $R^1$ is $C_1$–$C_4$ alkyl, $C_1$–$C_4$ alkoxy, $C_1$–$C_4$ halogenoalkyl, $C_1$–$C_4$ alkylsulfonyl or dialkylamino, each alkyl having 1 to 4 carbon atoms, or a piperidino group; $R^2$ is a hydrogen or halogen atom, $C_1$–$C_4$ alkyl, $C_1$–$C_4$ alkoxy or $C_1$–$C_4$ halogenoalkyl group or a nitro group; and $R^3$ is a hydrogen or halogen atom or $C_1$–$C_4$ alkyl, $C_1$–$C_4$ alkoxy or $C_1$–$C_4$ halogenoalkyl group, which comprises reacting a 2-aminomethyl indole represented by the formula,

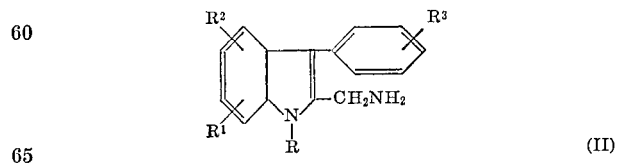

wherein R, $R^1$, $R^2$ and $R^3$ respectively have the same meanings as defined above, or an acid addition salt thereof with at least the stoichiometric amount of an oxidizing agent selected from the group consisting of ozone, hydrogen peroxide, peracids, chromic acid and potassium permanganate in an inert solvent.

2. A process for preparing benzodiazepine derivatives represented by the formula,

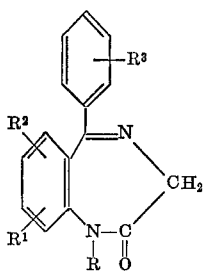
(I)

wherein R is a hydrogen atom or an alkyl group having 1 to 4 carbon atoms; $R^1$ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; $R^2$ is a hydrogen or halogen atom, an alkyl, alkoxy or halogenoalkyl group having 1 to 4 carbon atoms or a nitro group; and $R^3$ is a hydrogen or halogen atom or an alkyl, alkoxy or halogenoalkyl group having 1 to 4 carbon atoms, which comprises hydrogenating an indole-2-carbonitrile derivative represented by the formula,

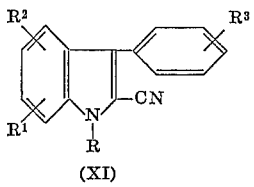
(XI)

wherein R, $R^1$, $R^2$ and $R^3$ respectively have the same meanings as defined above, after 1-alkylation of it, if desired, to yield a 2-aminomethyl indole derivative represented by the formula,

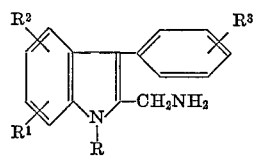
(II)

wherein R, $R^1$, $R^2$ and $R^3$ respectively have the same meanings as defined above, and then reacting the resultant 2-amino-methyl indole derivative of the Formula II or salt thereof with an oxidizing agent.

3. A process for preparing benzodiazepine derivatives represented by the formula,

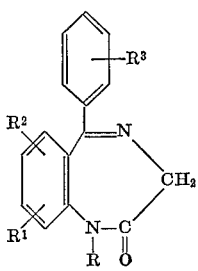
(I)

wherein R is a hydrogen atom or an alkyl group having 1 to 4 carbon atoms; $R^1$ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; $R^2$ is a hydrogen or halogen atom, an alkyl, alkoxy or halogenoalkyl group having 1 to 4 carbon atoms or a nitro group; and $R^3$ is a hydrogen or halogen atom or an alkyl, alkoxy or halogenoalkyl group having 1 to 4 carbon atoms, which comprises heating an indole-2-carboxamide derivative represented by the formula,

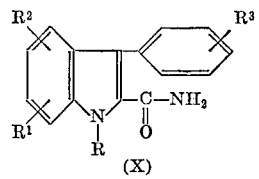
(X)

wherein R, $R^1$, $R^2$ and $R^3$ respectively have the same meanings as defined above, after 1-alkylation of it, if desired, to yield an indole-2-carbonitrile derivative represented by the formula,

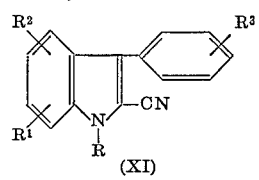
(XI)

wherein R, $R^1$, $R^2$ and $R^3$ respectively have the same meanings as defined above, hydrogenating the resultant indole-2-carbonitrile derivative after 1-alkylation of it, if desired, to yield a 2-aminomethyl indole derivative represented by the formula,

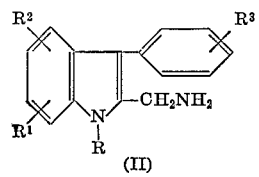
(II)

wherein R, $R^1$, $R^2$ and $R^3$ respectively have the same meanings as defined above, and then reacting the resultant 2-amino-methyl indole derivative of the Formula II or salt thereof with an oxidizing agent.

4. A process for preparing benzodiazepine derivatives represented by the formula,

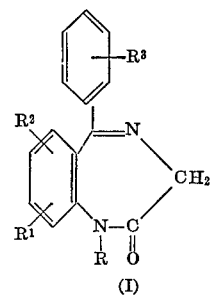
(I)

wherein R is a hydrogen atom or an alkyl group having 1 to 4 carbon atoms; $R^1$ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; $R^2$ is a hydrogen or halogen atom, an alkyl, alkoxy or halogenoalkyl group having 1 to 4 carbon atoms or a nitro group; and $R^3$ is a hydrogen or halogen atom or an alkyl, alkoxy or halogenoalkyl group having 1 to 4 carbon atoms, which comprises reducing an indole-2-carboxylic acid (thio)amide derivative represented by the formula,

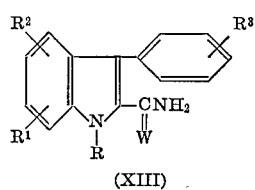
(XIII)

wherein R, $R^1$, $R^2$ and $R^3$ respectively have the same meanings as defined above and W is oxygen or sulfur, after 1-alkylation of it, if desired, to yield a 2-aminomethyl indole derivative represented by the formula,

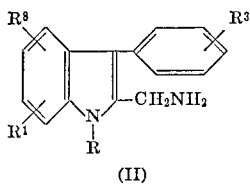

(II)

wherein R, R¹, R² and R³ respectively have the same meanings as defined above, and then reacting the resultant 2-amino-methyl indole derivative of the Formula II or salt thereof with an oxidizing agent to yield the benzodiazepine derivative of the Formula I.

5. A process for preparing benzodiazepine derivatives represented by the formula,

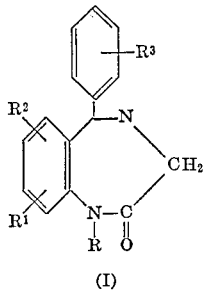

(I)

wherein R is a hydrogen atom or an alkyl group having 1 to 4 carbon atoms; R¹ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; R² is a hydrogen or halogen atom, an alkyl, alkoxy or halogenoalkyl group having 1 to 4 carbon atoms or a nitro group; and R³ is a hydrogen or halogen atom or an alkyl, alkoxy or halogenoalkyl group having 1 to 4 carbon atoms, which comprises reacting an indole-2-carboxylic acid derivative represented by the formula,

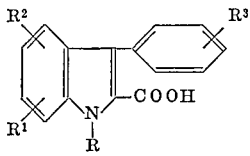

(VIIIb)

wherein R, R¹, R² and R³ respectively have the same meanings as defined above or reactive derivatives thereof with ammonia, after 1-alkylation of it, if desired, to yield an indole-2-carboxamide derivative represented by the formula,

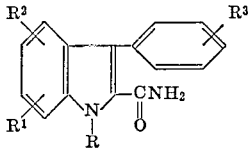

(X)

wherein R, R¹, R² and R³ respectively have the same meanings as defined above, heating the resultant indole derivative of the Formula X after 1-alkylation of it, if desired, to yield an indole-2-carbonitrile derivative represented by the formula,

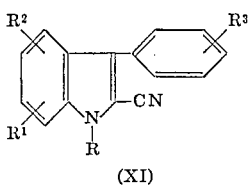

(XI)

wherein R, R¹, R² and R³ respectively have the same meanings as defined above, reducing the resultant indole-2-carbonitrile derivative of the Formula XI after 1-alkylation of it, if desired, to 2-aminomethyl indole derivative represented by the formula,

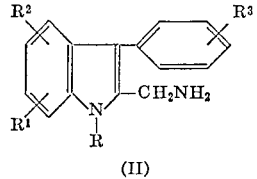

(II)

wherein R, R¹, R² and R³ respectively have the same meanings as defined above, and then reacting the resultant 2-amino-methyl indole derivative of the Formula II or salt thereof with an oxidizing agent to yield the benzodiazepine derivative of the Formula I.

6. A process for preparing benzodiazepine derivatives represented by the formula,

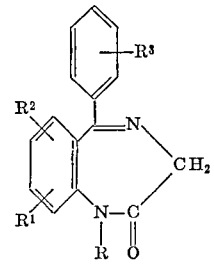

(I)

wherein R is a hydrogen atom or an alkyl group having 1 to 4 carbon atoms; R¹ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; R² is a hydrogen or halogen atom, an alkyl, alkoxy or halogenoalkyl group having 1 to 4 carbon atoms or a nitro group; and R³ is a hydrogen or halogen atom or an alkyl, alkoxy or halogenoalkyl group having 1 to 4 carbon atoms, which comprises reacting an indole-2-carboxylic acid derivative represented by the formula,

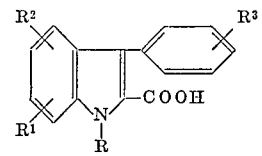

(VIIIb)

wherein R, R¹, R² and R³ respectively have the same meanings as defined above, with a halogenating agent after 1-alkylation of it, if desired, to yield an indole-2-carboxylic halide derivative represented by the formula,

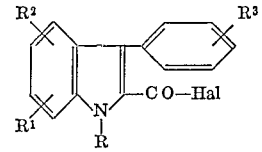

(IX)

wherein R, R¹, R² and R³ respectively have the same meanings as defined above and Hal is a halogen atom, reacting the resultant indole-2-carboxylic halide derivative with ammonia after 1-alkylation of it, if desired, to yield an indole-2-carboxamide derivative represented by the formula,

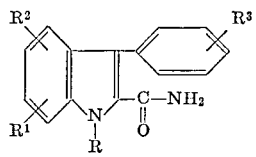

(X)

wherein R, R¹, R² and R³ respectively have the same meanings as defined above, heating the resultant indole-2-carboxamide derivative of the Formula X after 1-alkylation of it, if desired, to yield an indole-2-carbonitrile derivative represented by the formula,

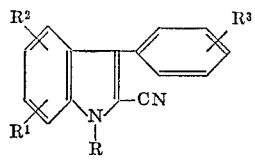

(XI)

wherein R, $R^1$, $R^2$ and $R^3$ respectively have the same meanings as defined above, hydrogenating the resultant indole-2-carbonitrile derivative of the Formula XI after 1-alkylation of it, if desired, to yield a 2-aminomethyl indole derivative represented by the formula,

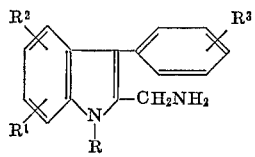

(II)

wherein R, $R^1$, $R^2$ and $R^3$ respectively have the same meanings as defined above, and reacting the resultant 2-aminomethyl indole derivative of the Formula II or salt thereof with an oxidizing agent to yield the benzodiazepine derivative of the Formula I.

7. A process for preparing benzodiazepine derivatives represented by the formula,

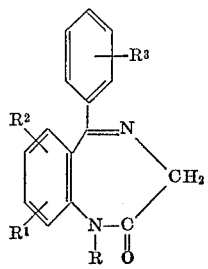

(I)

wherein R is a hydrogen atom or an alkyl group having 1 to 4 carbon atoms; $R^1$ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; $R^2$ is a hydrogen or halogen atom, an alkyl, alkoxy or halogenoalkyl group having 1 to 4 carbon atoms or a nitro group; and $R^3$ is a hydrogen or halogen atom or an alkyl, alkoxy or halogenoalkyl group having 1 to 4 carbon atoms, which comprises, converting an indole-2-carboxylic acid ester derivative represented by the formula,

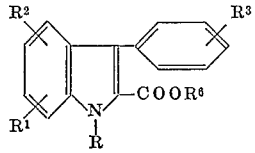

(VIIIc)

wherein R, $R^1$, $R^2$ and $R^3$ have the same meanings as defined above and $R^6$ is an alkyl group having 1 to 4 carbon atoms, after 1-alkylation of it, if desired, to an indole-2-carboxylic acid derivative represented by the formula,

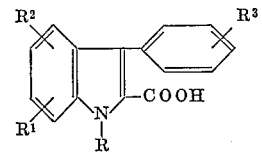

(VIIIb)

wherein R, $R^1$, $R^2$ and $R^3$ respectively have the same meanings as defined above, reacting the resultant indole-2-carboxylic acid derivative of the Formula VIIIb or reactive derivative thereof after 1-alkylation of it, if desired, with ammonia and further, if necessary, reacting the resultant compounds with phosphorus pentasulfide to yield an indole-2-carboxylic acid (thio)amide derivative represented by the formula,

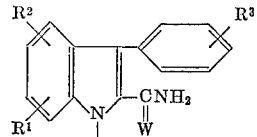

(XIII)

wherein R, $R^1$, $R^2$ and $R^3$ respectively have the same meanings as defined above, W is an oxygen atom or a sulfur atom, reducing the resultant indole-2-carboxylic acid derivative of the Formula XIII after 1-alkylation of it, if desired, to yield 2-aminomethyl indole derivative represented by the formula,

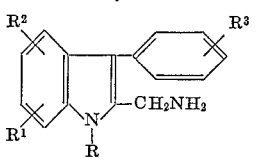

(II wherein R, $R^1$, $R^2$ and $R^3$ respectively have the same meanings as defined above, and then reacting the resultant 2-aminomethyl indole derivative of the Formula II or salt thereof with an oxidizing agent to yield the benzodiazepine derivative of the Formula I.

8. A process for preparing benzodiazepine derivatives represented by the formula,

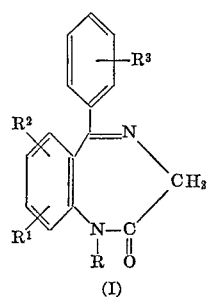

(I)

wherein R is a hydrogen atom or an alkyl group having 1 to 4 carbon atoms; $R^1$ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; $R^2$ is a hydrogen or halogen atom, an alkyl, alkoxy or halogenoalkyl group having 1 to 4 carbon atoms or a nitro group; and $R^3$ is a hydrogen or halogen atom or an alkyl, alkoxy or halogenoalkyl group having 1 to 4 carbon atoms, which comprises converting an indole-2-carboxylic acid ester derivative represented by the formula,

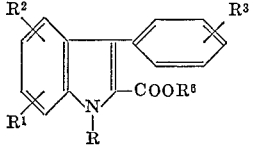

(VIIIc)

wherein R, $R^1$, $R^2$ and $R^3$ have the same meanings as defined above and $R^6$ is an alkyl group having 1 to 4 carbon atoms, after 1-alkylation of it, if desired, to indole-2-carboxylic acid derivative represented by the formula,

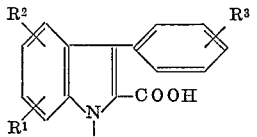

(VIIIb)

wherein R, $R^1$, $R^2$ and $R^3$ have the same meanings as defined above, reacting the resultant indole-2-carboxylic acid derivative of the Formula VIIIb with a halogenating agent after 1-alkylation of it, if desired, to yield an indole-2-carboxylic halide derivative represented by the formula,

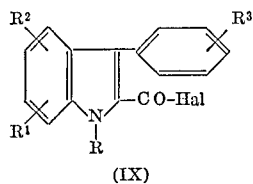

(IX)

wherein R, R¹, R² and R³ respectively have the same meanings as defined above and —Hal is a halogen atom, reacting the resultant indole-2-carboxylic halide with ammonia after 1-alkylation of it, if desired, to yield an indole-2-carboxamide derivative represented by the formula,

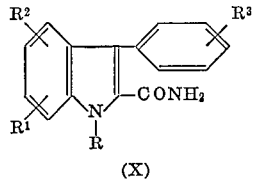

(X)

wherein R, R¹, R² and R³ respectively have the same meanings as defined above, reducing the resultant indole-2-carboxamide of the Formula X after 1-alkylation of it, if desired, to yield a 2-aminomethyl indole derivative represented by the formula,

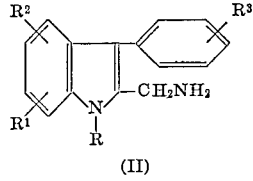

(II)

wherein R, R¹, R² and R³ respectively have the same meanings as defined above, and then reacting the resultant 2-aminomethyl indole derivative of the Formula II or salt thereof with an oxidizing agent to yield the benzodiazepine derivative of the Formula I.

9. A process for producing benzodiazepine derivatives represented by the formula,

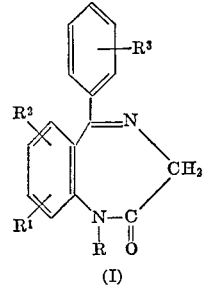

(I)

wherein R is a hydrogen atom or an alkyl group having 1 to 4 carbon atoms; R¹ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; R² is a hydrogen or halogen atom, an alkyl, alkoxy or halogenoalkyl group having 1 to 4 carbon atoms or a nitro group; and R³ is a hydrogen or halogen atom or an alkyl, alkoxy or halogenoalkyl group having 1 to 4 carbon atoms, which comprises reacting a phenylpyruvic acid derivative represented by the formula,

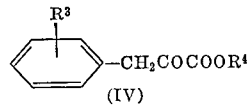

(IV)

wherein R⁴ is a hydrogen atom or an alkyl group having 1 to 4 carbon atoms and R³ has the same meaning as defined above with a phenylhydrazine derivative represented by the formula,

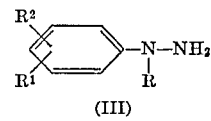

(III)

wherein R, R¹ and R² respectively have the same meanings as defined above, to yield an indole-2-carboxylic acid derivative represented by the formula,

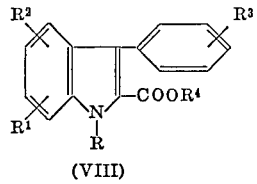

(VIII)

wherein R, R¹, R², R³, and R⁴ respectively have the same meanings as defined above, converting, if necessary, the resultant indole-2-carboxylic acid derivative (VIII) after 1-alkylation of it, if desired, to yield an indole-2-carboxylic acid derivative represented by the formula,

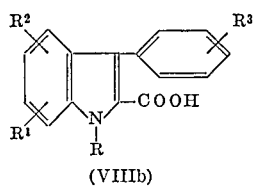

(VIIIb)

wherein R, R¹, R² and R⁴ respectively have the same meanings as defined above, reacting the resultant indole-2-carboxylic acid derivative of the Formula VIIIb or reactive derivative thereof with ammonia and further, if desired, reacting a reaction product with phosphorus pentasulfide after 1-alkylation of it, if desired, to yield an indole-2-carboxylic acid (thio)amide derivative represented by the formula,

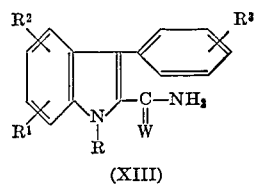

(XIII)

wherein R, R¹, R² and R³ respectively have the same meanings as defined above, W is an oxygen atom or a sulfur atom, reducing the resultant indole-2-carboxylic acid derivative of the Formula XIII after 1-alkylation of it, if desired, to yield a 2-aminomethyl indole derivative represented by the formula,

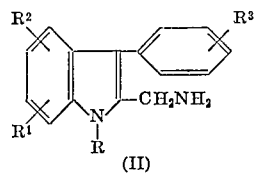

(II)

wherein R, R¹, R² and R³ respectively have the same meanings as defined above, and then reacting the resultant 2-aminomethyl indole derivative of the Formula II or salt thereof with an oxidizing agent to yield the benzodiazepine derivative of the Formula I.

10. A process for preparing benzodiazepine derivatives represented by the formula,

41

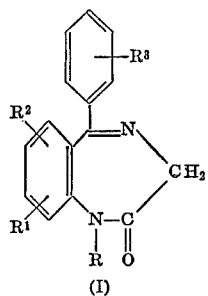

(I)

wherein R is a hydrogen atom or an alkyl group having 1 to 4 carbon atoms; $R^1$ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; $R^2$ is a hydrogen or halogen atom, an alkyl, alkoxy or halogenoalkyl group having 1 to 4 carbon atoms or a nitro group; and $R^3$ is a hydrogen or halogen atom or an alkyl, alkoxy or halogenoalkyl group having 1 to 4 carbon atoms, which comprises reacting a phenylpyruvic acid derivative represented by the formula,

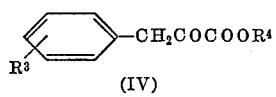

(IV)

wherein $R^4$ is a hydrogen atom or an alkyl group having 1 to 4 carbon atoms and $R^3$ has the same meaning as defined above with a phenylhydrazine derivative represented by the formula,

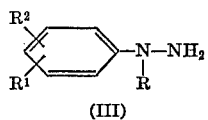

(III)

wherein R, $R^1$ and $R^2$ respectively have the same meanings as defined above, to yield an indole-2-carboxylic acid derivative represented by the formula,

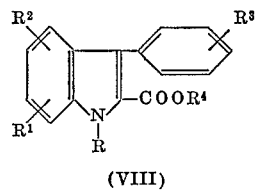

(VIII)

wherein R, $R^1$, $R^2$, $R^3$ and $R^4$ respectively have the same meanings as defined above, converting, if necessary, the resultant indole-2-carboxylic acid derivative (VIII) after 1-alkylation of it, if desired, to an indole-2-carboxylic acid derivative represented by the formula,

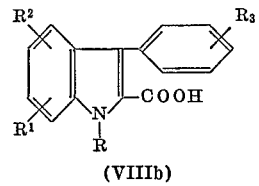

(VIIIb)

wherein R, $R^1$, $R^2$ and $R^3$ respectively have the same meanings as defined above, reacting the resultant indole-2-carboxylic acid derivative of the Formula VIII or reactive derivatives thereof with ammonia after 1-alkylation of it, if desired, to yield an indole-2-carboxamide derivative represented by the formula,

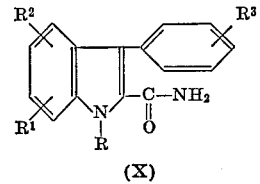

(X)

42 wherein R, $R^1$, $R^2$ and $R^3$ respectively have the same meanings as defined above, reducing the resultant indole-2-carboxylic acid derivative of the Formula X after 1-alkylation of it, if desired, to yield an indole-2-carbonitrile derivative represented by the formula,

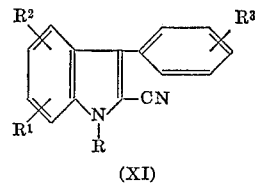

(XI)

wherein R, $R^1$, $R^2$ and $R^3$ respectively has the same meanings as defined above, hydrogenating the resulting indole-2-carbonitrile (XI) after 1-alkylation of it, if desired, to yield 2-aminomethyl indole derivative represented by the formula,

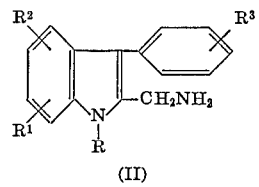

(II)

wherein R, $R^1$, $R^2$ and $R^3$ respectively have the same meanings as defined above, and then reacting the resultant 2-aminomethyl indole derivative of the Formula II or salt thereof with an oxidizing agent to yield the benzodiazepine derivative of the Formula I.

11. A process for producing benzodiazepine derivatives represented by the formula,

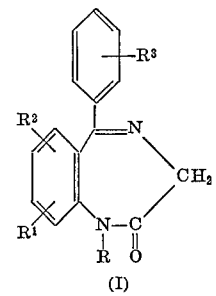

(I)

wherein R is a hydrogen atom or an alkyl group having 1 to 4 carbon atoms; $R^1$ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; $R^2$ is a hydrogen or halogen atom, an alkyl, alkoxy or halogenoalkyl group having 1 to 4 carbon atoms or a nitro group; and $R^3$ is a hydrogen or halogen atom or an alkyl, alkoxy or halogenoalkyl group having 1 to 4 carbon atoms, which comprises reacting an ester derivative of β-keto acid represented by the formula,

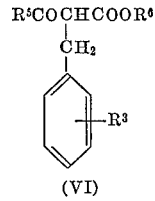

(VI)

wherein $R^5$ is an alkyl group having 1 to 4 carbon atoms and $R^6$ is an alkyl group having 1 to 4 carbon atoms and $R^3$ has the same meaning as defined above, with a benzene diazonium salt represented by the formula,

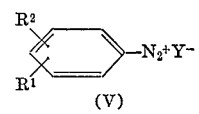

(V)

wherein R¹ and R² have the same meanings as defined above and Y is a halogen atom, to yield an indole-2-carboxylic acid ester derivative represented by the formula,

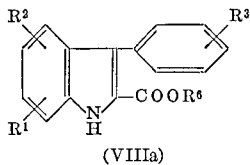

(VIIIa)

wherein R¹, R², R³ and R⁶ respectively have the same meanings as defined above, converting the resultant indole-2-carboxylic acid ester derivative of the Formula VIIIa after 1-alkylation of it, if desired, to an indole-2-carboxylic acid derivative represented by the formula,

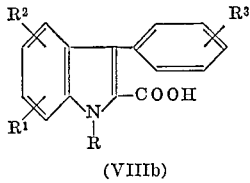

(VIIIb)

wherein R, R¹, R² and R³ respectively have the same meanings as defined above, reacting the resultant indole-2-carboxylic acid derivative of the Formula VIIIb or reactive derivative thereof with ammonia after 1-alkylation of it, if desired, and further, if necessary, reacting the resultant compound with phosphorus pentasulfide to yield an indole-2-carboxylic acid (thio)amide derivative represented by the formula,

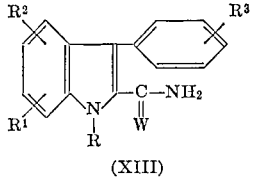

(XIII)

wherein R, R¹, R² and R³ respectively have the same meanings as defined above, W is an oxygen atom or a sulfur atom, reducing the resultant indole-2-carboxylic acid (thio)amide derivative to (XIII) after 1-alkylation of it, if desired, a 2-aminomethyl indole derivative represented by the formula,

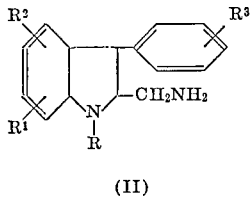

(II)

wherein R, R¹, R² and R³ respectively have the same meanings as defined above, and then reacting the resultant 2-amino-methyl indole derivative of the Formula II or salt thereof with an oxidizing agent to yield the benzodiazepine derivative of the Formula I.

12. A process for preparing benzodiazepine derivatives represented by the formula,

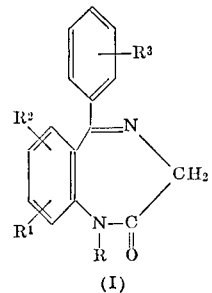

(I)

wherein R is a hydrogen atom or an alkyl group having 1 to 4 carbon atoms; R¹ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; R² is a hydrogen or halogen atom, an alkyl, alkoxy or halogenoalkyl group having 1 to 4 carbon atoms or a nitro group; and R³ is a hydrogen or halogen atom or an alkyl, alkoxy or halogenoalkyl group having 1 to 4 carbon atoms, which comprises reacting an ester derivative of β-keto acid represented by the formula,

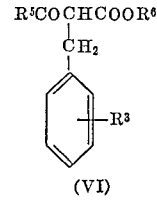

(VI)

wherein R⁵ is an alkyl group having 1 to 4 carbon atoms and R⁶ is an alkyl group having 1 to 4 carbon atoms and R³ has the same meaning as defined above, with a benzene diazonium salt represented by the formula,

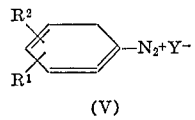

(V)

wherein R¹ and R² has the same meanings as defined above and Y is a halogen atom, to yield indole-2-carboxylic acid ester derivative represented by the formula,

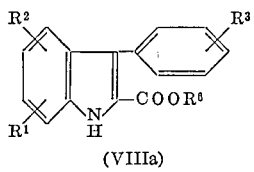

(VIIIa)

wherein R¹, R², R³ and R⁶ respectively have the same meanings as defined above, converting the resultant indole-2-carboxylic acid derivative of the Formula VIIIa after 1-alkylation of it, if desired, to an indole-2-carboxylic acid derivative represented by the formula,

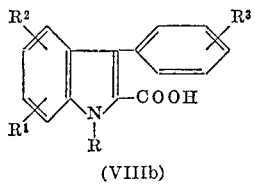

(VIIIb)

wherein R, R¹, R² and R³ respectively have the same meanings as defined above, reacting the resultant indole-2-carboxylic acid derivative of the Formula VIIIb or reactive derivative thereof with ammonia after 1-alkylation of it, if desired, to yield an indole-2-carboxamide derivative represented by the formula,

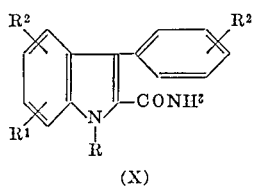

(X)

wherein R, R¹, R² and R³ respectively have the same meanings as defined above, dehydrating the resultant indole-2-carboxamide derivative (X) after 1-alkylation of it, if desired, to yield an indole-2-carbonitrile derivative represented by the formula,

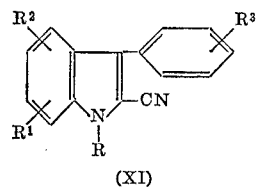

(XI)

wherein R, R¹, R² and R³ respectively have the same meanings as defined above, hydrogenating the resultant indole-2-carbonitrile derivative (XI) after 1-alkylation of it, if desired, to yield a 2-aminomethyl-indole derivative represented by the formula,

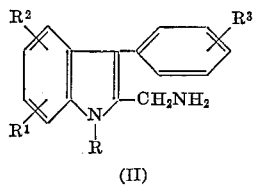

(II)

wherein R, R¹, R² and R³ respectively have the same meanings as defined above, and then reacting the resultant 2-amino-methyl indole derivative of the Formula II or salt thereof with an oxidizing agent to yield the benzodiazepine derivative of the Formula I.

13. A process for producing benzodiazepine derivatives represented by the formula,

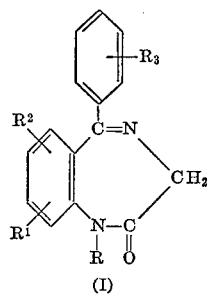

(I)

wherein R is a hydrogen atom or an alkyl group having 1 to 4 carbon atoms; R¹ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; R² is a hydrogen or halogen atom, an alkyl, alkoxy or halogenoalkyl group having 1 to 4 carbon atoms or a nitro group; and R³ is a hydrogen or halogen atom or an alkyl, alkoxy or halogenoalkyl group having 1 to 4 carbon atoms, which comprises reacting a phenylpyruvic acid derivative represented by the formula

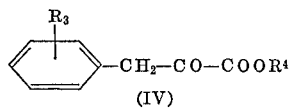

(IV)

wherein R³ has the same meanings as defined above, and R⁴ is a hydrogen atom or an alkyl group having 1 to 4 carbon atoms, with a phenylhydrazine derivative represented by the formula,

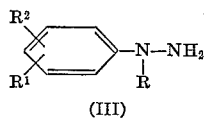

(III)

wherein R, R¹ and R² respectively have the same meanings as defined above, to yield a phenylhydrazone derivative represented by the formula,

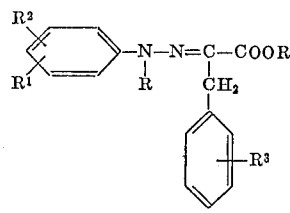

(VII)

wherein R, R¹, R², R³ and R⁴ respectively have the same meanings as defined above, treating the resultant phenylhydrazone derivative [VII] after N-alkylation of it, if desired, to yield an indole-2-carboxylic acid derivative represented by the formula,

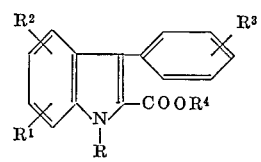

wherein R, R¹, R², R³ and R⁴ respectively have the same meanings as defined above, converting, if necessary, the resultant indole-2-carboxylic acid derivative [VIII] after 1-alkylation of it, if desired, to yield an indole-2-carboxylic acid derivative represented by the formula,

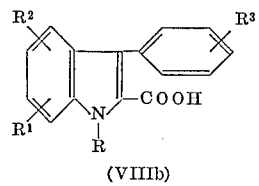

(VIIIb)

wherein R, R¹, R² and R⁴ respectively have the same meanings as defined above, reacting the resultant indole-2-carboxylic acid derivative of the Formula VIIIb or reactive derivative thereof with ammonia and further, if desired, reacting a reaction product with phosphorus pentasulfide after 1-alkylation of it, if desired, to yield an indole-2-carboxylic acid (thio)amide derivative represented by the formula,

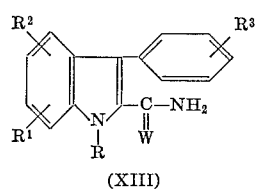

(XIII)

wherein R, R¹, R² and R³ respectively have the same meanings as defined above, W is an oxygen atom or a sulfur atom, reducing the resultant indole-2-carboxylic acid derivative of the Formula XIII after 1-alkylation of it, if desired, to yield a 2-aminomethyl indole derivative represented by the formula,

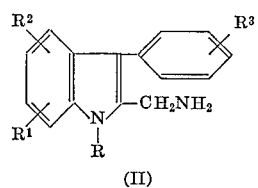

(II)

wherein R, R¹, R² and R³ respectively have the same meanings as defined above, and then reacting the resultant 2-aminomethyl indole derivative of the Formula II or salt thereof with an oxidizing agent to yield the benzodiazepine derivative of the Formula I.

14. A process for producing benzodiazepine derivatives represented by the formula,

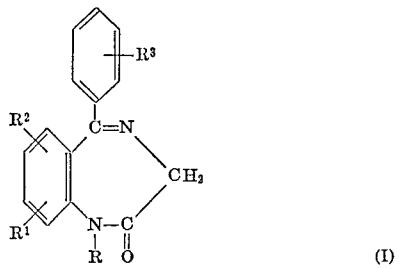

wherein R is a hydrogen atom or an alkyl group having 1 to 4 carbon atoms; $R^1$ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; $R^2$ is a hydrogen or halogen atom, an alkyl, alkoxy or halogenoalkyl group having 1 to 4 carbon atoms or a nitro group; and $R^3$ is a hydrogen or halogen atom or an alkyl, alkoxy or halogenoalkyl group having 1 to 4 carbon atoms, which comprises reacting a phenylpyruvic acid derivative represented by the formula,

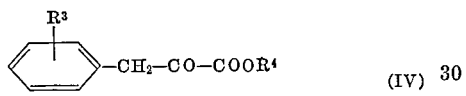

wherein $R^3$ has the same meanings as defined above, and $R_4$ is a hydrogen atom or an alkyl group having 1 to 4 carbon atoms, with a phenylhydrazine derivative represented by the formula,

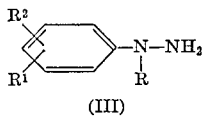

wherein R, $R^1$ and $R^2$ respectively have the same meanings as defined above, to yield a phenylhydrazone derivative represented by the formula,

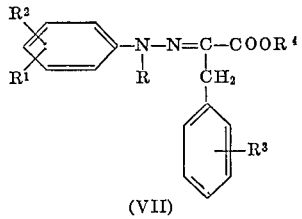

wherein R, $R^1$, $R^2$, $R^3$ and $R^4$ respectively have the same meanings as defined above, treating the resultant phenylhydrazone derivative (VII) after N-alkylation of it, if desired, to yield an indole-2-carboxylic acid derivative represented by the formula,

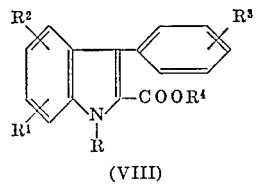

wherein R, $R^1$, $R^2$, $R^3$ and $R^4$ respectively have the same meanings as defined above, converting, if necessary, the resultant indole-2-carboxylic acid derivative (VIII) after 1-alkylation of it, if desired, to an indole-2-carboxylic acid derivative represented by the formula,

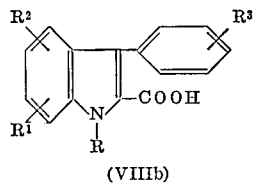

wherein R, $R^1$, $R^2$ and $R^3$ respectively have the same meanings as defined above, reacting the resultant indole-2-carboxylic acid derivative of the Formula VIII or reactive derivatives thereof after 1-alkylation of it, if desired, to yield an indole-2-carboxamide derivative represented by the formula,

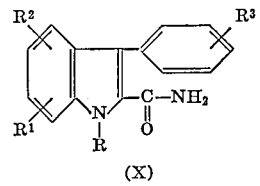

wherein R, $R^1$, $R^2$ and $R^3$ respectively have the same meanings as defined above, reducing the resultant indole-2-carboxylic acid derivative of the Formula X after 1-alkylation of it, if desired, to yield an indole-2-carbonitrile derivative represented by the formula,

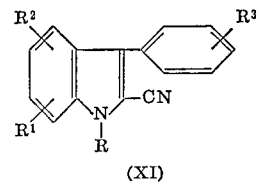

wherein R, $R^1$, $R^2$ and $R^3$ respectively have the same meanings as defined above, hydrogenating the resulting indole-2-carbonitrile (XI) after 1-alkylation of it, if desired, to yield 2-aminomethyl indole derivative represented by the formula,

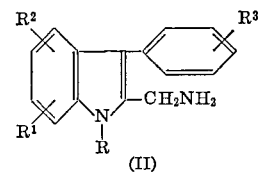

wherein R, $R^1$, $R^2$ and $R^3$ respectively have the same meanings as defined above, and then reacting the resultant 2-aminomethyl indole derivative of the Formula II or salt thereof with an oxidizing agent to yield the benzodiazepine derivative of the Formula I.

15. A process for producing benzodiazepine derivatives represented by the formula,

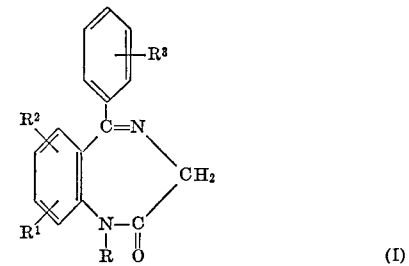

wherein R is a hydrogen atom or an alkyl group having 1 to 4 carbon atoms; $R^1$ is an alkyloxy halogenoalkyl group having 1 to 4 carbon atoms, an alkylsulphonyl group having 1 to 4 carbon atoms, a dialkylamino group having 1 to 4 carbon atoms or a piperidino group; $R^2$ is a hydrogen or halogen atom, an alkyl, alkoxy or halogenoalkyl group having 1 to 4 carbon atoms or a nitro group; and $R^3$ is a hydrogen or halogen atom or an alkyl, alkoxy or halogenoalkyl group having 1 to 4 carbon atoms, which comprises reacting a benzene diazonium salt represented by the formula,

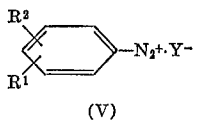

(V)

wherein $R^1$ and $R^2$ respectively have the same meanings as defined above, and Y is a halogen atom, with an ester derivative of β-keto acid represented by the formula,

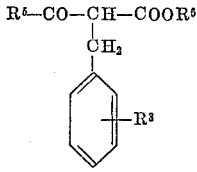

wherein $R^3$ has the same meanings as defined above, $R^5$ is an alkyl having 1 to 4 carbon atoms and $R^6$ is an alkyl having 1 to 4 carbon atoms, to yield a phenylhydrazone derivative represented by the formula,

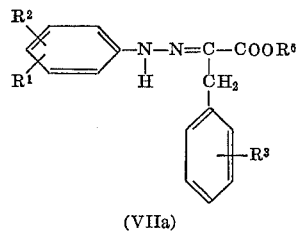

(VIIa)

wherein $R^1$, $R^2$, $R^3$ and $R^6$ respectively have the same meanings as defined above, treating the resultant phenylhydrazone derivative (VIIa) after N-alkylation of it, if desired, to yield an indole-2-carboxylic acid derivative represented by the formula,

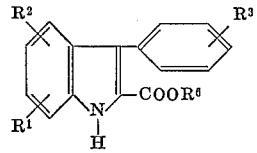

wherein $R^1$, $R^2$, $R^3$ and $R^6$ respectively have the same meanings as defined above, converting the resultant indole-2-carboxylic acid ester derivative of the Formula VIIIa after 1-alkylation of it, if desired, to an indole-2-carboxylic acid derivative represented by the formula,

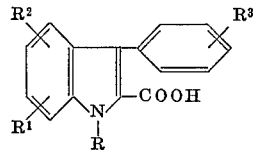

(VIIIb)

wherein R, $R^1$, $R^2$ and $R^3$ respectively have the same meanings as defined above, reacting the resultant indole-2-carboxylic acid derivative of the Formula VIIIb or reactive derivative thereof with ammonia after 1-alkylation of it, if desired, and further, if necessary, reacting the resultant compound with phosphorus pentasulfide to yield an indole-2-carboxylic acid (thio)amide derivative represented by the formula,

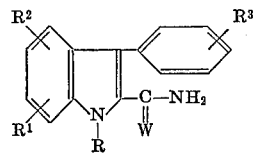

(XIII)

wherein R, $R^1$, $R^2$ and $R^3$ respectively have the same meanings as defined above, W is an oxygen atom or a sulfur atom, reducing the resultant indole-2-carboxylic acid (thio)amide derivative to (XIII) after 1-alkylation of it, if desired, a 2-aminomethyl indole derivative represented by the formula,

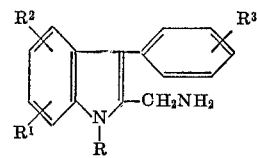

(II)

wherein R, $R^1$, $R^2$ and $R^3$ respectively have the same meanings as defined above, and then reacting the resultant 2-aminomethyl indole derivative of the Formula II or salt thereof with an oxidizing agent to yield the benzodiazepine derivative of the Formula I.

16. A process for producing benzodiazepine derivative represented by the formula,

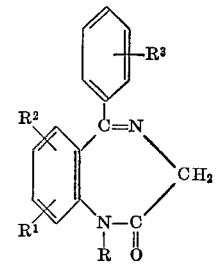

(I)

wherein R is a hydrogen atom or an alkyl group having 1 to 4 carbon atoms; $R^1$ is an alkyl, alkoxy, halogenoalkyl group having 1 to 4 carbon atoms, an alkylsulfonyl group having 1 to 4 carbon atoms, a dialkylamino group having 1 to 4 carbon atoms or a piperidino group; $R^2$ is a hydrogen or halogen atom, an alkyl, alkoxy or halogenoalkyl group having 1 to 4 carbon atoms or a nitro group; and $R^3$ is a hydrogen or halogen atom or an alkyl, alkoxy or halogenoalkyl group having 1 to 4 carbon atoms, which comprises reacting a benzene diazonium salt represented by the formula,

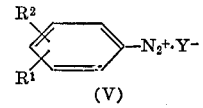

(V)

wherein $R^1$ and $R^2$ respectively have the same meanings as defined above, and Y is a halogen atom, with an ester derivative of β-keto acid represented by the formula,

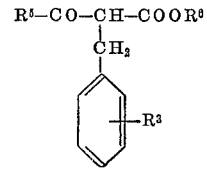

wherein $R^3$ has the same meanings as defined above, $R^5$ is an alkyl having 1 to 4 carbon atoms and $R^6$ is an alkyl having 1 to 4 carbon atoms, to yield a phenylhydrazone derivative represented by the formula,

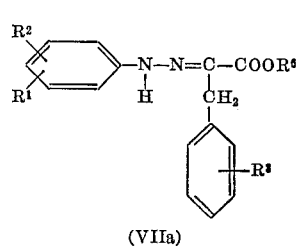

(VIIa)

wherein $R^1$, $R^2$, $R^3$ and $R^6$ respectively have the same meanings as defined above, treating the resultant phenylhydrazone derivative (VIIa) after N-alkylation of it, if desired, to yield an indole-2-carboxylic acid derivative represented by the formula,

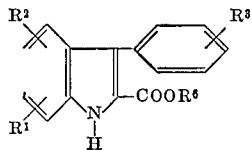

wherein $R^1$, $R^2$, $R^3$ and $R^6$ respectively have the same meanings as defined above, converting the resultant indole-2-carboxylic acid derivative of the Formula VIIIa after 1-alkylation of it, if desired, to an indole-2-carboxylic acid derivative represented by the formula,

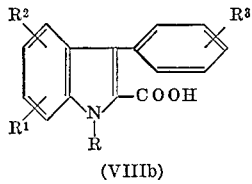

(VIIIb)

wherein R, $R^1$, $R^2$ and $R^3$ respectively have the same meanings as defined above, reacting the resultant indole-2-carboxylic acid derivative of the Formula VIIIb or reactive derivative thereof with ammonia after 1-alkylation of it, if desired, to yield an indole-2-carboxamide derivative represented by the formula,

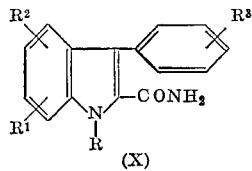

(X)

wherein R, $R^1$, $R^2$ and $R^3$ respectively have the same meanings as defined above, dehydrating the resultant indole-2-carboxamide derivative (X) after 1-alkylation of it, if desired, to yield an indole-2-carbonitrile derivative represented by the formula,

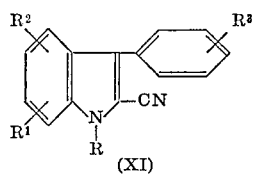

(XI)

wherein R, $R^1$, $R^2$ and $R^3$ respectively have the same meanings as defined above, hydrogenating the resultant indole-2-carbonitrile derivative (XI) after 1-alkylation of it, if desired, to yield a 2-aminomethyl-indole derivative represented by the formula,

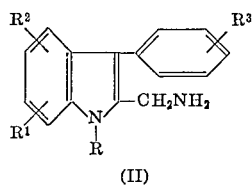

(II)

wherein R, $R^1$, $R^2$ and $R^3$ respectively have the same meanings as defined above, and then reacting the resultant 2-aminomethyl indole derivative of the Formula II or salt thereof with an oxidizing agent to yield the benzodiazepine derivative of the Formula I.

17. A process according to claim 1 wherein said reaction is carried out in the presence of an inert solvent selected from the group consisting of water, acetone, carbon tetrachloride, acetic acid, and sulfuric acid.

References Cited

Elderfield: "Heterocyclic Compounds," vol. 3, pp. 8–13 (Wiley) (1952).

Noller: "Chemistry of Organic Compounds," 2nd ed., pp. 250, 254 (Saunders) (1957).

Chemical Abstracts, vol. 52 (1958), cols. 11039–11040, abstracting Nogradi "Monatsh. Chem.," vol. 88, pp. 1087–94 (1958).

HENRY R. JILES, Primary Examiner

R. T. BOND, Assistant Examiner

U.S. Cl. X.R.

260—999, 326.13, 326.12, 141, 326.15, 569, 326.14, 515 R, 293 D